United States Patent
Yagashira et al.

(10) Patent No.: US 10,252,707 B2
(45) Date of Patent: Apr. 9, 2019

(54) BRAKE CONTROL SYSTEM, BRAKE SYSTEM, AND BRAKE HYDRAULIC PRESSURE GENERATING METHOD

(71) Applicant: Hitachi Automotive Systems, Ltd., Hitachinaka-shi, Ibaraki (JP)

(72) Inventors: Hideaki Yagashira, Zama (JP); Hiroki Sonoda, Atsugi (JP); Asahi Watanabe, Kasawaki (JP); Toshiya Oosawa, Yokohama (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 0 days.

(21) Appl. No.: 15/300,875

(22) PCT Filed: Apr. 24, 2014

(86) PCT No.: PCT/JP2014/061521
§ 371 (c)(1),
(2) Date: Sep. 30, 2016

(87) PCT Pub. No.: WO2015/162744
PCT Pub. Date: Oct. 29, 2015

(65) Prior Publication Data
US 2017/0015293 A1 Jan. 19, 2017

(51) Int. Cl.
*B60T 8/40* (2006.01)
*B60T 13/66* (2006.01)
(Continued)

(52) U.S. Cl.
CPC ............ *B60T 13/662* (2013.01); *B60T 7/042* (2013.01); *B60T 8/4081* (2013.01);
(Continued)

(58) Field of Classification Search
CPC ...... B60T 7/042; B60T 8/4081; B60T 13/142; B60T 13/146; B60T 13/662; B60T 13/686; B60T 2270/82
See application file for complete search history.

(56) References Cited

U.S. PATENT DOCUMENTS 6,464,307 B1 10/2002 Yoshino
6,604,795 B2 * 8/2003 Isono .................... B60T 8/4081
303/11

(Continued)

FOREIGN PATENT DOCUMENTS

EP 1 103 436 A2 5/2001
JP 2001-213295 A 8/2001
(Continued)

OTHER PUBLICATIONS

International Search Report (PCT/ISA/210) issued in PCT Application No. PCT/JP2014/061521 dated Jul. 29, 2014 with English translation (five pages).

(Continued)

*Primary Examiner* — Thomas W Irvin
(74) *Attorney, Agent, or Firm* — Crowell & Moring LLP

(57) ABSTRACT

A system comprises: pump (hydraulic pressure source) that uses brake fluid supplied from reservoir tank (reservoir) to generate hydraulic pressure in first hydraulic line, thereby generating hydraulic pressure in wheel cylinder; piston configured to move axially in cylinder under the action of hydraulic fluid supplied from master cylinder, piston dividing cylinder into at least two chambers (positive pressure chamber and backpressure chamber); stroke simulator for generating reaction force to a driver's brake operation by moving piston; second hydraulic line provided between positive pressure chamber in stroke simulator and master cylinder; and third hydraulic chamber provided between (Continued)

backpressure chamber and first hydraulic chamber to transmit brake fluid from backpressure chamber to first hydraulic chamber.

23 Claims, 14 Drawing Sheets

(51) Int. Cl.
    *B60T 13/14*              (2006.01)
    *B60T 13/68*              (2006.01)
    *B60T 7/04*               (2006.01)

(52) U.S. Cl.
    CPC .......... *B60T 13/142* (2013.01); *B60T 13/146* (2013.01); *B60T 13/686* (2013.01); *B60T 2270/82* (2013.01)

(56) References Cited

U.S. PATENT DOCUMENTS

| | | | |
|---|---|---|---|
| 6,899,403 B2 * | 5/2005 | Isono | B60T 8/4018 303/11 |
| 7,770,982 B2 * | 8/2010 | Gottwick | B60T 13/145 303/11 |
| 9,205,824 B2 * | 12/2015 | Feigel | B60T 8/4081 |
| 9,315,180 B2 * | 4/2016 | Jungbecker | B60T 8/4081 |
| 9,365,199 B2 * | 6/2016 | Drumm | B60T 8/3655 |
| 9,381,901 B2 * | 7/2016 | Kobayashi | B60T 13/662 |
| 9,499,149 B2 * | 11/2016 | Kobayashi | B60T 13/662 |
| 9,527,486 B2 * | 12/2016 | Maruo | B60T 8/4081 |
| 9,821,783 B2 * | 11/2017 | Watanabe | B60T 7/042 |
| 9,868,424 B2 * | 1/2018 | Brenndoerfer | B60T 8/4081 |
| 9,988,028 B2 * | 6/2018 | Oosawa | B60T 8/4081 |
| 2002/0084693 A1 | 7/2002 | Isono et al. | |
| 2005/0151418 A1 * | 7/2005 | Bickel | B60T 7/042 303/122 |
| 2005/0162008 A1 * | 7/2005 | Bickel | B60T 8/4081 303/113.4 |
| 2012/0169112 A1 | 7/2012 | Jungbecker et al. | |
| 2012/0193973 A1 | 8/2012 | Kunz et al. | |
| 2013/0062932 A1 * | 3/2013 | Yagashira | B60T 8/4054 303/3 |
| 2015/0061854 A1 * | 3/2015 | Drumm | B60T 7/042 340/453 |
| 2016/0221553 A1 * | 8/2016 | Watanabe | B60T 7/042 |
| 2017/0274879 A1 * | 9/2017 | Okochi | B60T 8/409 |
| 2017/0282876 A1 * | 10/2017 | Oosawa | B60T 8/4081 |
| 2018/0022332 A1 * | 1/2018 | Sonoda | B60T 8/4081 |

FOREIGN PATENT DOCUMENTS

| | | |
|---|---|---|
| JP | 2002-255021 A | 9/2002 |
| JP | 2007-210372 A | 8/2007 |
| JP | 2010-38169 A | 2/2010 |
| JP | 2014-61818 A | 4/2014 |
| WO | WO 2011/029812 A1 | 3/2011 |
| WO | WO 2013/094592 A1 | 6/2013 |

OTHER PUBLICATIONS

European Search Report issued in counterpart European Application No. 14890035.0 dated Apr. 5, 2017 (12 pages).

* cited by examiner

BRAKE CONTROL SYSTEM, BRAKE SYSTEM, AND BRAKE HYDRAULIC PRESSURE GENERATING METHOD

TECHNICAL FIELD

The present invention relates to an automotive brake control system.

BACKGROUND ART

Brake control systems are known that comprise a stroke simulator for generating force reacting to a driver's braking operation and use a hydraulic pressure source separate from a master cylinder to generate hydraulic pressure that is applied to the wheel cylinders at road wheels (e.g., Patent Document 1).

CITATION LIST

Patent Document

Patent Document 1: International Publication No. 2011/029812

SUMMARY OF THE INVENTION

Problem to be Solved by the Invention

Conventional brake control systems may require a larger or more expensive actuator for a hydraulic pressure source to improve pressure response in wheel cylinders. The object of the present invention is to provide a brake control system with an improved response to a demand for increasing wheel cylinder pressure without the need for increasing an actuator in size, etc.

Means for Solving the Problem

To achieve this object, the brake control system of the present invention applies pressure to the wheel cylinders, preferably using brake fluid flowing from a stroke simulator that operates in response to the driver's brake operation.

Effect of the Invention

This keeps the size or the like of the actuator to the minimum and improves the response to the demand for wheel cylinder pressure increase.

Figure 1:
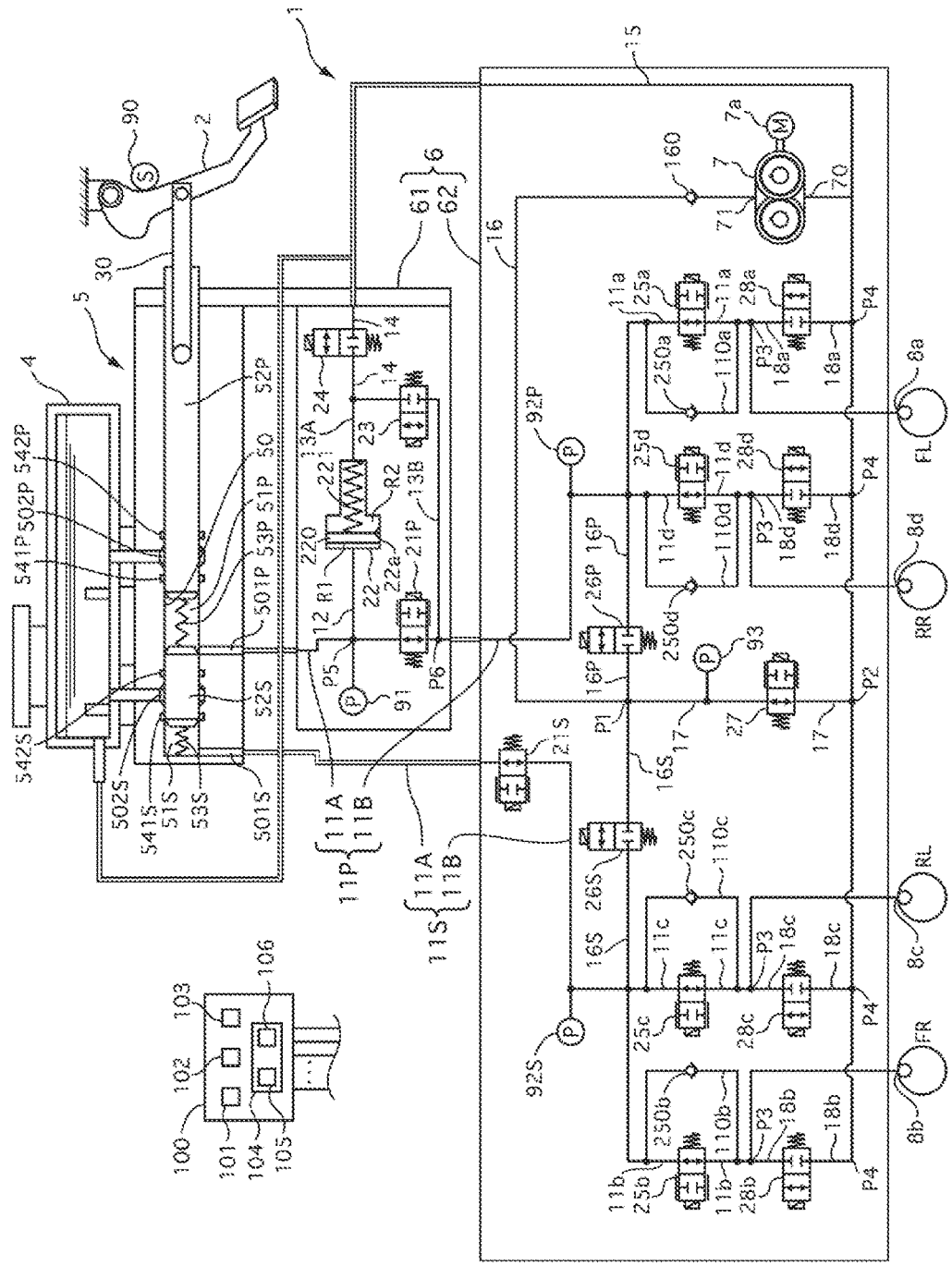
FIG. 1 is a schematic view of a brake control system of a first embodiment.

REFERENCE NUMERALS 1. brake control system
4. reservoir tank
5. master cylinder
7. pump (hydraulic pressure source)
7a. motor (electric motor)
8. wheel cylinder
11. first hydraulic line
12. second hydraulic line
13. third hydraulic line
14. fourth hydraulic line
21. cutoff valve
22. stroke simulator
220. piston
23. stroke simulator IN valve (control valve)
230. check valve (one-way valve, second one-way valve)
24. stroke simulator OUT valve
24A. constriction
100. ECU (control unit)
105. auxiliary pressure controller (rotational speed measuring unit, wheel cylinder hydraulic pressure measuring unit)
FL to RR: wheels
R1. positive pressure chamber
R2. backpressure chamber

EMBODIMENTS

The embodiments of the brake control system of the present invention will now be described with reference to the accompanying drawings.

First Embodiment

[Structure]
First, the structure of the brake control system of the first embodiment (hereinafter "system 1") will be described. FIG. 1 schematically shows the structure of system 1. System 1 is a hydraulic brake system suited for a hybrid vehicle equipped with a motor generator (electric motor) as a drive for driving the wheels, in addition to an engine (internal combustion engine), and an electrically powered vehicle, such as one that solely relies on a motor generator. System 1 may also be applied to a vehicle that solely relies on an engine for drive power. System 1 supplies wheel cylinders 8 at wheels FL to RR of the vehicle with brake fluid to generate brake fluid pressure (wheel cylinder hydraulic pressure) that acts as hydraulic braking force on wheels FL to RR. Wheel cylinders 8 may be ones of a hydraulic brake caliper of a disk brake mechanism as well as a drum brake mechanism. System 1 comprises two brake piping systems (P (primary) system and S (secondary) system)) of, for example, a diagonally split configuration. The brake piping systems may, instead, be of other configuration, such as a front-rear split configuration. Below, the members of the P system are indicated by the letter P and the S system by S to distinguish them, where necessary.

Brake pedal 2 is a brake operation member that receives an input from a driver through brake operation. Brake pedal 2 is provided with stroke sensor 90 for sensing the displacement of brake pedal 2. The displacement of brake pedal 2 is a brake stroke representing the amount of the driver's brake operation. Stroke sensor 90 may, instead, sense the displacement of a piston (e.g., primary piston 52P, which will be described later) of master cylinder 5 as a pedal stroke. Brake pedal 2 is pivotally connected at its root to an end of pushrod 30.

Reservoir tank (reservoir) 4 is a brake fluid source, which is a low pressure section exposed to the atmospheric pressure. Master cylinder 5 generates brake hydraulic pressure (master cylinder pressure) in response to the driver's operation of brake pedal 2 (brake operation). Master cylinder 5 is connected via pushrod 30 to brake pedal 2 and is supplied with brake fluid from reservoir tank 4. Master cylinder 5 is of tandem type comprising master cylinder pistons that move axially in response to the driver's brake operation, namely, primary piston 52P connected to pushrod 30 and second piston 52S of free piston type. In this embodiment, system 1 does not have a vacuum booster that uses intake negative pressure generated by the vehicle engine to boost the brake operation (pedal effort).

System 1 comprises hydraulic pressure control unit 6 and electronic control unit 100. Hydraulic pressure control unit 6 is a brake control unit that operates, independent of the driver's brake operation, to generate hydraulic pressure by receiving a supply of brake fluid from reservoir tank 4 or master cylinder 5. Electronic control unit (ECU) 100 is a control unit for controlling the operation of hydraulic pressure control unit 6.

Hydraulic pressure control unit 6 is located between wheel cylinders 8 and master cylinder 5 to individually supply wheel cylinders 8 with master cylinder hydraulic pressure or control hydraulic pressure. Hydraulic pressure control unit 6 has motor 7a of pump 7 and a plurality of control valves (solenoid valves 21 or the like) serving as a hydraulic pressure device (actuator) for generating control hydraulic pressure. Pump 7 takes brake fluid from reservoir tank 4 while electric motor 7a (electric motor) is running and delivers the brake fluid to wheel cylinders 8. In this embodiment, pump 7 is a gear pump having excellent noise/judder characteristics or the like, namely, an external gear pump unit. Pump 7 is shared by the two systems and driven by single motor 7a serving as a drive source. Motor 7a may be, for example, a brush motor. Motor 7a is provided with a resolver for sensing the rotational position (angle of rotation) of the output shaft of motor 7. Solenoid valves 21 or the like open and close in response to a control signal to control a flow of brake fluid. With communication between master cylinder 5 and wheel cylinders 8 cut off, hydraulic pressure control unit 6 uses hydraulic pressure generated by pump 7 to increase the pressure in wheel cylinders 8. Hydraulic pressure control unit 6 comprises stroke simulator 22. Stroke simulator 22 operates in accordance with the driver's brake operation to receive brake fluid transmitted from master cylinder 5 to generate a pedal stroke. Hydraulic pressure control unit 6 comprises hydraulic sensors 91 to 93 that sense hydraulic pressures at different locations, such as the output pressure from pump 7 and master cylinder pressure.

ECU 100 receives sensor values from the resolver, pedal stroke sensor 90 and hydraulic sensors 91 to 93 and information on driving conditions sent from the vehicle. Using these items of information, ECU 100 performs information processing, following a stored program. On the basis of the result of this processing, ECU 100 outputs a control command to each actuator of hydraulic pressure control unit 6 to control the actuators. More specifically, ECU 100 controls opening/closing operation of solenoid valves 21 or the like, which change the state of communication of hydraulic line 11 or the like, and also controls the rotational speed (the amount of fluid from pump 7) of motor 7a for driving pump 7. Controlling the hydraulic pressure in the wheel cylinders on wheels FL to RR in this manner, ECU 100 achieves boost control that assists in braking operation by generating hydraulic braking force to compensate for any shortage of the driver's braking effort, antilock control for minimizing slip (lockup tendency) of wheels FL to RR caused by braking, brake control for vehicle dynamic control (vehicle stability control for antiskid, etc.; hereinafter "ESC"), automatic braking control, such as adaptive cruise control, cooperative regenerative braking control for controlling the hydraulic pressure in the wheel cylinders to attain a target deceleration (target braking force) in cooperation with regenerative braking or such other control.

Master cylinder 5 is connected via first hydraulic line 11 (described later) to wheel cylinders 8 and serves as a first hydraulic pressure source for increasing wheel cylinder hydraulic pressure. Master cylinder 5 uses master cylinder pressure generated in first fluid chamber (primary chamber) 51P to apply pressure to wheel cylinders 8a and 8d via a hydraulic line (first hydraulic line 11P) of system P, and also uses master cylinder pressure generated in second fluid chamber (secondary chamber) 51S to apply pressure to wheel cylinders 8b and 8c via a hydraulic line (first hydraulic line 11S) of system S. Pistons 52 of master cylinder 5 are inserted in a tubular cylinder 50 having a closed bottom to move axially along the inner circumferential surface of cylinder 50. Cylinder 50 comprises outlet port (supply port) 501 and inlet port 502 both for each of systems P and S. Outlet port 501 is connected to hydraulic pressure control unit 6 to communicate with wheel cylinders 8. Inlet port 502 is communicatively connected to reservoir tank 4. First fluid chamber 51P, located between pistons 52P and 52S, contains compressed coil spring 53P, serving as a return spring. Second fluid chamber 51S, located between piston 52S and the axial end of cylinder 50, contains compressed coil spring 53S. Each of first and second fluid chambers 51P and 51S has outlet port 501 normally open thereto.

Cylinder 50 has piston seals 54 (at numerals 541 and 542 in the figure) on the inner circumference thereof. Piston seals 54 are a plurality of seal members that slide on seal piston 52P or 52S to seal between the outer circumferential surface of each of pistons 52P and 52S and the inner circumferential surface of cylinder 50. Each piston seal 54 is a seal member (cup seal) of a known cup-shaped cross section having a lip on its inner radial side. When the lip is in contact with the outer circumferential surface of piston 52, brake fluid is allowed to flow in one direction and is prevented from flowing in the other direction. First piston seal 541 allows brake fluid to flow from inlet port 502 toward first and second fluid chambers 51P and 51S (outlet port 501), while preventing brake fluid from flowing in the opposite direction. Second piston seal 542 allows brake fluid to flow toward inlet port 502, while preventing fluid brake from flowing out from inlet port 502. First and second fluid chambers 51P and 51S decrease in volume to develop hydraulic pressure (master cylinder pressure) as pistons 52 are moved in the axial direction opposite to brake pedal 2 by the driver stepping on brake pedal 2. This causes brake fluid to pass from first and second fluid chambers 51P and 51S through outlet ports 501 to wheel cylinders 8. Systems P and S generate substantially equal levels of hydraulic pressure in first and second fluid chambers 51P and 51S.

Now, the brake fluid pressure circuit of hydraulic pressure control unit 6 will be described with reference to FIG. 1. Letters a to d are attached to the end of reference characters to indicate members for wheels FL to RR, respectively. Hydraulic line 11 connects outlet ports 501 (first and second fluid chambers 51P and 51S) of master cylinder 5 to wheel cylinders 8. Cutoff valve 21 is a normally open solenoid valve (that is open when electric current is not applied thereto) in first hydraulic line 11. First hydraulic line 11 is divided by cutoff valve 21 into hydraulic line 11A on the master cylinder 5 side and hydraulic line 11B on the wheel cylinder 8 side. Solenoid IN valves (pressure increasing valves) SOL/V IN 25 are normally open solenoid valves on respective wheels FL to RR (or in respective hydraulic lines 11a to 11d) on the wheel cylinder 8 side (hydraulic line 8 side) of cutoff valve 21 in first hydraulic line 11. Disposed in parallel to first hydraulic line 11 is bypass hydraulic line 110 that bypasses SOL/V IN 25. Bypass hydraulic line 110 is provided with a check valve (one-way valve) 250 that admits only brake fluid flowing from the wheel cylinder 8 side to the master cylinder 5 side.

Inlet hydraulic line 15 connects reservoir tank 4 to inlet 70 of pump 7. Outlet hydraulic line 16 connects outlet 71 of pump 7 to a portion of first hydraulic line 11 connecting cutoff valve 21 to SOL/V IN 25. Check valve 160 is an outlet valve of pump 7 that is located in outlet hydraulic line 16 and admits only brake fluid flowing from the outlet 71 side to the first hydraulic line 11 side. Outlet hydraulic line 16 divides at point P1 on the downstream side of check valve 160 into outlet hydraulic line 16P of system P and outlet hydraulic line 16S of system S. Hydraulic lines 16P and 16S are connected to first hydraulic line 11P of system P and first hydraulic line 11S of system S, respectively. Outlet hydraulic lines 16P and 16S form a communication passage interconnecting first hydraulic lines 11P and 11S. Communication valve 26P is a normally closed solenoid valve (closed when electric current is not applied) provided in outlet hydraulic line 16P. Communication valve 26S is a normally closed solenoid valve provided in outlet hydraulic line 16S. Pump 7 is a second hydraulic pressure source that uses brake fluid supplied from reservoir tank 4 to generate hydraulic pressure in first hydraulic line 11. Pump 7 is connected via the communication passage (outlet hydraulic lines 16P and 16S) and first hydraulic lines 11P and 11S to wheel cylinders 8a to 8d and can increase wheel cylinder hydraulic pressure by delivering brake fluid to the communication passage (outlet hydraulic lines 16P and 16S).

First pressure-reducing hydraulic line 17 connects inlet hydraulic line 15 to a portion of outlet hydraulic line 16 between check valve 160 and communication valve 26. In this embodiment, first pressure reducing hydraulic line 17 connects point P1 and point P2. Pressure regulating valve 27 is a normally open solenoid valve serving as a first pressure reducing valve in first pressure reducing hydraulic line 17. Second pressure reducing hydraulic line 18 connects inlet hydraulic line 15 to a portion of first hydraulic line 11 (hydraulic line 11B) on the wheel cylinder 8 side of SOL/V IN 25. In this embodiment, second pressure reducing hydraulic line 18 connects point P3 and point P4. Solenoid OUT valve (pressure reducing valve) SOL/V OUT 28 is a normally closed solenoid valve serving as a second pressure reducing valve in second pressure reducing line 18.

Second hydraulic line 12 is a branch hydraulic line that branches at point P5 off from first hydraulic line 11P and connects to stroke simulator 22. Stroke simulator 22 comprises piston 220 and spring 221. Piston 200 is a partition wall that divides the interior of cylinder 22a of stroke simulator 22 into two chambers (positive pressure chamber R1 and backpressure chamber R2), and is axially movable in cylinder 22a. The word "axially" refers to the direction of compression of spring 221. Piston 220 has a seal member (not shown) on its outer circumferential surface, facing the inner circumferential surface of cylinder 22a. The seal member seals off the outer circumference of the piston 220 to prevent communication of brake fluid between the positive pressure chamber (primary chamber) R1 and the backpressure chamber (secondary chamber) R2, thereby keeping chambers R1 and R2 fluid-tight against each other. Spring 221 is a coil spring (elastic member) compressed in backpressure chamber R2, namely, urging means that always urge piston 200 toward the positive pressure chamber R1 (in the direction of reducing the volume of positive pressure chamber R1 and increasing the volume of backpressure chamber R2). Spring 221 is so disposed as to exert reaction force according to a displacement (stroke) of piston 220.

Second hydraulic line 12 branches off at point 5 from a portion (hydraulic line 11A) of first hydraulic line 11P between outlet port 50P (first fluid chamber 51P) of master cylinder 5 and cutoff valve 21P and connects to positive-pressure chamber R1 of stroke simulator 22. Third hydraulic line 13 is a first back-pressure hydraulic line connecting backpressure chamber R2 of stroke simulator 22 to first hydraulic line 11. Third hydraulic line 13 branches off at position P6 between cutoff valve 21P and SOL/V IN 25 in first hydraulic line 11P (hydraulic line 11B) and connects to backpressure chamber R2 of stroke simulator 22. Stroke simulator IN valve SS/V IN 23 is a normally closed first simulator cutoff valve in third hydraulic line 13. Third hydraulic line 13 is divided by SS/V IN 23 into hydraulic line 13A on the backpressure chamber R2 side and hydraulic line 13B on the first hydraulic line 11 side. Fourth hydraulic line 14 is a second backpressure hydraulic line connecting backpressure chamber R2 of stroke simulator 22 and reservoir tank 4. Fourth hydraulic line 14 connects hydraulic line 13A of third hydraulic line 13, located between backpressure chamber R2 and SS/V IN 23, and inlet hydraulic line 15. Stroke-simulator OUT valve SS/V OUT 24 is a normally closed second simulator cutoff valve in fourth hydraulic line 14. Alternatively, fourth hydraulic line 14 may be directly connected to backpressure chamber R2 or reservoir tank 4. In this embodiment, part of fourth hydraulic line 14 on the backpressure chamber R2 side corresponds to third hydraulic line 13, and part of fourth hydraulic line 14 on the reservoir tank 4 side corresponds to part of inlet hydraulic line 15, so as to simplify the overall hydraulic line structure. If fourth hydraulic line 14 is perceived as a hydraulic line directly connected to backpressure chamber R2, third hydraulic line 13 can be thought of as connecting hydraulic line 11B and the portion of fourth hydraulic line 14 between backpressure chamber R2 and SS/V OUT 24. In other words, hydraulic line 13A forms part of fourth hydraulic line 14, and third hydraulic line 13 consists only of hydraulic line 13B.

Cutoff valve 21, SOL/V IN 25, and pressure regulating valve 27 are proportional control valves that adjust the degree of valve opening in accordance with electric current applied to their solenoid. The other valves, namely, communication valve 26, SOL/V OUT valve 28, SS/V OUT 24, and SS/V IN 23 are on-off valves that are controlled to switch between two values to open and close. These other valves may instead be proportional control valves. In a portion (hydraulic line 11A) of first hydraulic line 11P between cutoff valve 21P and master cylinder 5 is disposed hydraulic sensor 91 for sensing hydraulic pressure in that portion (master cylinder pressure and hydraulic pressure in positive pressure chamber R1 of stroke simulator 22). Hydraulic sensor 91 may instead be disposed in second hydraulic line 12. In a portion of first hydraulic line 11 between cutoff valve 21 and SOL/V IN 25 is disposed a hydraulic sensor (primary-system pressure sensor, secondary-system pressure sensor) 92 for sensing hydraulic pressure (wheel cylinder hydraulic pressure) in that portion. In a portion of first pressure reducing hydraulic line 17 between its connection to outlet hydraulic line 16 and pressure regulating valve 27 is disposed hydraulic sensor 93 for sensing hydraulic pressure (pump outlet pressure) in that portion. Hydraulic sensor 93 may instead be disposed in a portion of outlet hydraulic line 16 between outlet 71 (check valve 160) of pump 7 and communication valve 26.

Hydraulic pressure control unit 6 comprises first unit 61 and second unit 62. First unit 61 comprises cutoff valve 21P of system P, SS/V IN 23, SS/V OUT 24, and hydraulic sensor 91, in addition to stroke simulator 22. Second unit 62 comprises the other actuators and sensors in addition to pump 7, namely, valves 21S and 25 to 28, hydraulic sensors 92 and 93, and motor 7a. Second unit 62 is integrated with ECU 100. First unit 61 is integrated with the unit comprising master cylinder 5 and reservoir tank 4. In other words, master cylinder 5 and stroke simulator 22 are housed in separate housings. First unit 61, containing stroke simulator 22, is integrated with master cylinder 5, such that first unit 61 and master cylinder 5 together form one unit. Pump 7 is housed in a housing separate from master cylinder 5 and stroke simulator 22. Pump 7 and valves 21S and 25 to 28 are housed in the same housing to form a hydraulic unit (second unit 62). First and second units 61 and 62 are adapted to actively control the master cylinder hydraulic pressure and the wheel cylinder hydraulic pressure by controlling the actuators in response to a control command from ECU 100.

With cutoff valve 21 open, the brake system (first hydraulic line 11) connecting fluid chamber 51 of master cylinder 5 and wheel cylinders 8 forms a first system that uses master cylinder pressure exerted by pedal effort to generate wheel cylinder hydraulic pressure and thereby achieves pedal effort braking (control without boosting). On the other hand, with cutoff valve 21 closed, the brake system (inlet hydraulic line 15, outlet hydraulic line 16, etc.) including pump 7 and connecting reservoir tank 4 and wheel cylinders 8 forms a second system that uses hydraulic pressure generated by pump 7 to generate wheel cylinder hydraulic pressure, that is, a so-called brake-by-wire system that achieves boost control or the like.

During brake-by-wire control, stroke simulator 22 generates reaction force in response to the driver's braking operation. With cutoff valve 21 closed and the communication between master cylinder 5 and wheel cylinders 8 cut off, stroke simulator 22 generates a pedal stroke by allowing at least brake fluid coming out of master cylinder 5 (first fluid chamber 51P) to first hydraulic line 11P to flow via second hydraulic line 12 into positive pressure chamber R1. With SS/V OUT 24 open establishing communication between backpressure chamber R2 and reservoir tank 4, stroke simulator 22 generates a pedal stroke in such a manner that positive pressure chamber R1 allows brake fluid to flow into or out of master cylinder 5 as the driver performs braking operation (stepping on brake pedal 2 or releasing it). More specifically, when the pressure differential between hydraulic pressure (master cylinder pressure acting as a positive pressure) acting on a pressure-receiving surface of piston 220 in positive pressure chamber R1 and hydraulic pressure (back pressure) acting on a pressure-receiving surface of piston 220 in backpressure R2 exceeds a predetermined value, piston 220 compresses spring 221 and axially moves toward backpressure chamber R2, increasing the volume of positive pressure chamber R1. In this manner, brake fluid flows from master cylinder 5 (outlet port 501P) via the hydraulic line (first hydraulic line 11P and second hydraulic line 12) into positive pressure chamber R1, while brake fluid flows out of backpressure chamber R2 via fourth hydraulic line 14 into reservoir tank 4. Fourth hydraulic line 14 serves its purpose as long as it is connected to a low-pressure section into which brake fluid can flow, and is not required to be connected to reservoir tank 4. When the pressure differential has dropped below the predetermined value, the urging force (resilient force) of spring 221 returns piston 220 to its initial position. Since the reaction force exerted by spring 221 acting on piston 220 is proportional to the displacement of piston 220, reaction force generated that acts on brake pedal 2 (hereinafter "pedal reaction force") is proportional to the operation of brake pedal 2. Drawing brake fluid from master cylinder 5 and generating the pedal reaction force in this manner, stroke simulator 22 reproduces a proper feel of the pedal when depressed, approximating the stiffness of fluid in wheel cylinders 8.

ECU 100 comprises: brake operating condition detector 101; calculator 102 for calculating a target wheel cylinder hydraulic pressure; pedal-effort braking force generator 103; and wheel-cylinder hydraulic pressure controller 104. Brake operating condition detector 101 receives an input of a value sensed by stroke sensor 90, thereby measuring a displacement (pedal stroke S) of brake pedal 2 as an amount of brake operation. More specifically, brake operating condition detector 101 receives a value output from stroke sensor 90 and calculates pedal stroke S. Brake operating condition detector 101 determines whether the driver is operating the brakes (whether brake pedal 2 is being operated) on the basis of pedal stroke S and measures or estimates the rate of driver's brake operation. In other words, the rate of brake operation is measured or estimated by computing the rate of change of pedal stroke S (pedal stroke speed $\Delta S/\Delta t$). Stroke sensor 90 is not limited to one that directly senses a displacement of brake pedal 2, and may be one that senses a displacement of pushrod 3. Alternatively, a pedal sensor for sensing force acting on brake pedal 2 may be used to measure or estimate an amount of brake operation from a value sensed by the pedal sensor. The amount of brake operation may instead be measured or estimated on the basis of a value sensed by hydraulic sensor 91. In other words, the amount of brake operation used for control is not limited to the pedal stroke and may be any other proper variable.

Calculator 102 for calculating a target wheel-cylinder hydraulic pressure calculates a target wheel-cylinder hydraulic pressure. For example, during boost control, calculator 102 for calculating a target wheel-cylinder hydraulic pressure calculates, on the basis of a pedal stroke detected, target wheel-cylinder hydraulic pressure Pw* that achieves ideal characteristics of the relation between the pedal stroke and a brake hydraulic pressure required by the driver (vehicle deceleration G required by the driver), in accordance with a predetermined boost ratio. For example, in the case of a brake apparatus comprising a vacuum booster of ordinary size, this embodiment uses predetermined characteristics of the relation between a pedal stroke and a wheel-cylinder hydraulic pressure (braking force) achieved during operation of the vacuum booster as the above-described ideal relational characteristics for calculating target wheel-cylinder hydraulic pressure Pw*. During antilock control, calculator 102 for calculating a target wheel-cylinder hydraulic pressure calculates target wheel-cylinder hydraulic pressure Pw* for each of wheels FL to RR to bring the wheel to a proper degree of slip (amount of deviation of the speed of the wheel from a simulated vehicle speed). During ESC, calculator 102 for calculating a target wheel-cylinder hydraulic pressure calculates target wheel-cylinder hydraulic pressure Pw* for each of wheels FL to RR on the basis of, for example, a measured amount of vehicle dynamic conditions (e.g., lateral acceleration) to achieve desired vehicle dynamic conditions. During regenerative cooperation brake control, calculator 102 for calculating a target wheel-cylinder hydraulic pressure calculates target wheel-cylinder hydraulic pressure Pw* in relation to regenerative braking force. For example, target wheel-cylinder hydraulic pressure Pw* so calculated is such that the sum of a regenerative braking force input from a control unit of a regenerative braking system and a hydraulic braking force corresponding to the target wheel-wheel hydraulic pressure satisfies a vehicle deceleration required by the driver.

Pedal-effort braking force generator 103 opens cutoff valve 21 and thereby brings hydraulic pressure control unit 6 into a condition of generating wheel cylinder hydraulic pressure from master cylinder pressure (first system) to achieve pedal-effort braking. At this stage, SS/V OUT 24 and SS/V IN 23 are closed so that stroke simulator 22 does not respond to the driver's brake operation. Alternatively, SS/V IN 23 may be opened.

Wheel-cylinder hydraulic pressure controller 104 closes cutoff valve 21 and thereby brings hydraulic pressure control unit 6 into a condition in which pump 7 (second system) can be used to generate wheel cylinder hydraulic pressure (pressure-increasing control), so as to perform hydraulic control (e.g., boost control) that achieves a target wheel-cylinder hydraulic pressure by controlling the actuators of hydraulic pressure control unit 6. More specifically, wheel-cylinder hydraulic pressure controller 104 closes cutoff valve 21, opens communication valve 26, closes pressure-regulating valve 27, and actuates pump 7. This control enables a desired amount of brake fluid to flow from reservoir tank 4 via inlet hydraulic line 15, pump 7, outlet line 16, and first hydraulic line 11 into wheel cylinders 8. At the same time, the rotational speed of pump 7 and the opening (e.g., degree of opening) of pressure-regulating valve 27 are controlled by feedback to bring a value sensed by hydraulic sensor 92 toward a target wheel-cylinder hydraulic pressure, thereby providing a desired braking force. In other words, the opening of pressure-regulating valve 27 is controlled to allow brake fluid to escape from outlet hydraulic line 16 or first hydraulic line 11 through pressure-regulating valve 27 into inlet hydraulic line 15, as required, thereby making it possible to adjust wheel cylinder pressure. This control of pressure-regulating valve 27 is hereinafter referred to as escape control. In this embodiment, in principle, the degree of opening of pressure-regulating valve 27, rather than rotating speed of pump 7 (motor 7a), is adjusted (escape control) to control wheel-cylinder hydraulic pressure. For example, a command value for the rotational speed of motor 7a is set to a large value fixed while increasing wheel cylinder hydraulic pressure, and is otherwise held at a small fixed value while holding or decreasing the wheel cylinder hydraulic pressure, so as to generate a required minimum pump discharge pressure (provide a pump discharge rate). Since this embodiment uses a proportional control valve for pressure-regulating valve 27, fine control can be performed to achieve smooth control of the wheel cylinder hydraulic pressure. Cutoff valve 21 can be closed to cut the master cylinder 5 side off from the wheel cylinder 8 side to facilitate control of the wheel cylinder hydraulic pressure independent of the driver's pedal operation.

During normal braking in which a braking force corresponding to the driver's brake operation (pedal stroke) is generated in front and rear wheels FL to RR, wheel-cylinder hydraulic pressure controller 104, in principle, performs boost control. In the boost control, SOL/V IN 25 on each of wheels FL to RR is opened, and SOL/V OUT 28 is closed. While cutoff valves 21P and 21S are closed, pressure regulating valve 27 is closed (under feedback control of the degree of opening or the like) and communication valve 26 is opened, and pump 7 is actuated with rotational speed command valve Nm* for motor 7a set to a fixed value. SS/V OUT 24 is opened and SS/V IN 23 is closed.

Wheel-cylinder hydraulic pressure controller 104 has auxiliary pressure controller 105. Auxiliary pressure control supplements the wheel cylinder pressure generated from pump 7 by supplying brake fluid flowing from backpressure chamber R2 of stroke simulator 22 to wheel cylinders 8 during the driver's brake control. The auxiliary pressure control serves as a backup control for the wheel cylinder pressure control by pump 7. Auxiliary pressure controller 105 executes the auxiliary pressure control in accordance with the driver's braking operation when wheel-cylinder hydraulic pressure control 104 increases the wheel cylinder hydraulic pressure at wheels FL to RR in accordance with the driver's operation of brake pedal 2 (an increase in pedal stroke) (when controlling the pressure on the wheel cylinders with the aid of pump 7) during normal brake operation (boost control).

More specifically, SS/V OUT 24 is closed and SS/V IN 23 is opened. In this way, the path of brake fluid flowing from backpressure chamber R2 of stroke simulator 22 in response to the driver's brake operation, which path has led through fourth hydraulic line 14 to reservoir tank 4, now serves as a flow path that leads through third hydraulic line 13 to first hydraulic line 11P (11B). The brake fluid flowing from backpressure chamber R2 in response to the driver's pedal effort is now sent through third hydraulic line 13 to first hydraulic line 11P (11B). This brake fluid acts to pressurize wheel cylinders 8 to supplement the hydraulic pressure on wheel cylinders 8 exerted by pump 7. In this manner, SS/V OUT 24 and SS/V IN 23 serve as a switch for switching the flow path. Auxiliary pressure controller 105 determines whether the driver's brake operation is a predetermined emergency braking operation or not. If yes (if brake pedal 2 is stepped on rapidly), auxiliary pressure controller 105 performs auxiliary pressure control. If no (if brake pedal 2 is not stepped on rapidly), it does not perform auxiliary pressure control. If the brake operating rate measured or estimated by brake operating condition detector 101 is greater than or equal to a set value, auxiliary pressure controller 105 recognizes the braking operation as the above-mentioned predetermined emergency brake operation. If the brake operating rate is lower than the set value, it recognizes the braking operation as non-emergency. In the case of detecting an emergency brake operation, auxiliary pressure control is performed if a measured or estimated rotational speed Nm of motor 7*a* is a set value Nm0 or less and a measured pedal stroke S (amount of braking is less than or equal to a set value S0).

Figure 2:
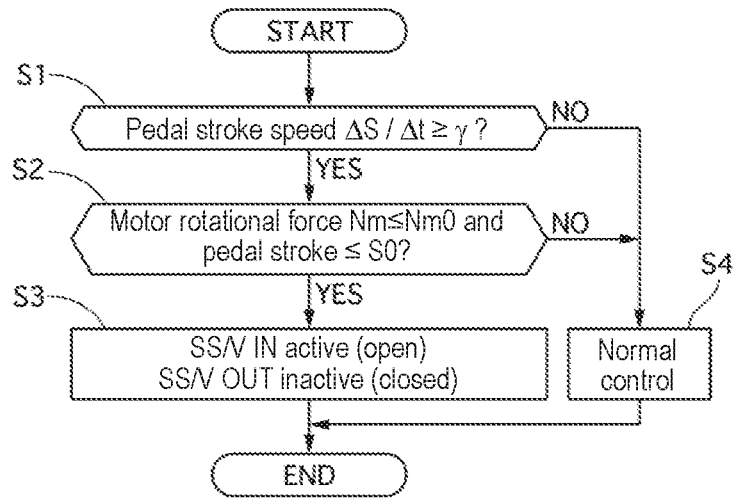
FIG. 2 is a flowchart of the essential part of control of wheel cylinder hydraulic pressure of the first embodiment.

FIG. 2 is a flowchart of the control by wheel cylinder hydraulic pressure controller 104 during normal braking (boost control). This process is programmed as software in ECU 100 and is repeated at predetermined intervals. In step S1, auxiliary pressure controller 105 determines whether the braking rate (pedal stroke speed ΔS/Δt) measured or estimated by brake operating condition detector 101 is greater than or equal to a set value γ. If yes, it recognizes the braking operation as an emergency one, and the process goes to step S2. If no, it recognizes the braking operation as a non-emergency one, and the process goes to step S4. In step S2, auxiliary pressure controller 105 determines whether the rotational speed of motor 7*a* detected or estimated from a detection signal from a resolver (hereinafter "motor rotational speed Nm") is less than or equal to a set value Nm0 (a final determining threshold for auxiliary pressure control) and pedal stroke S sensed by brake operating condition detector 101 is a set value S0 (a final determining threshold for auxiliary pressure control) or less. If motor rotational speed Nm is a set value Nm0 or less and pedal stroke S is a set value S0 or less, the process goes to step S3. If motor rotational speed Nm is greater than set value Nm0 or pedal stroke S is greater than set value S0, the process goes to step S4. In step S3, auxiliary pressure controller 105 activates (opens) SS/V IN 23 and deactivates (closes) SS/V OUT 24 and implements auxiliary pressure control. In step S4, wheel cylinder hydraulic pressure controller 104 deactivates (closes) SS/V IN 23 and activates (opens) SS/V OUT 24 and does not implements (terminates) the auxiliary pressure control. In this manner, normal boost control is carried out.

[Operation]

Operation proceeds in the following manner. Wheel cylinder hydraulic pressure controller 104 closes cutoff valve 21 when the driver steps on brake pedal 2. This allows an amount of brake fluid flowing from master cylinder 5 (first fluid chamber 51P), which amount corresponds to the pedal stroke, to flow via second hydraulic line 12 into positive pressure chamber R1 of stroke simulator 22. When the force against piston 220 arising from the master cylinder hydraulic pressure (or its equivalent hydraulic pressure) in positive pressure chamber R1 exceeds the sum of the force against piston 220 arising from the wheel cylinder pressure (or its equivalent pressure) in backpressure chamber R2 and the force of spring 221 urging piston 220, piston 220 runs a stroke while compressing spring 221. This allows the amount of brake fluid equivalent to the amount flowing into positive pressure chamber R1 (corresponding to the pedal stroke) to flow from backpressure chamber R2.

When pump 7 performs normal wheel cylinder pressure control, SS/V OUT 24 is opened and SS/V IN 23 is closed. This puts backpressure chamber R2 of stroke simulator 22 into communication with inlet hydraulic line 15 (reservoir tank 4) and cuts off communication between backpressure chamber R2 and first hydraulic line 11P (wheel cylinders 8). Brake fluid flowing from backpressure chamber R2 is released via fourth hydraulic line 14 to reservoir tank 4. Brake fluid pumped out of pump 7 flows via outlet hydraulic line 16 into first hydraulic line 11 (11B). This flow of brake fluid into wheel cylinders 8 exerts pressure on them. In other words, the hydraulic pressure generated in first hydraulic line 11 by pump 7 is used to exert pressure on wheel cylinders 8. The force against piston 220 exerted by spring 221 and backpressure (hydraulic pressure corresponding to the atmospheric pressure) creates pedal reaction force.

In auxiliary pressure control, SS/V OUT 24 is closed and SS/V IN 23 is opened. This cuts off the communication between backpressure chamber R2 of stroke simulator 22 and inlet hydraulic line 15 (reservoir tank 4) and establishes communication between backpressure chamber R2 and first hydraulic line 11P (wheel cylinders 8). This changes the flow path of brake fluid flowing from backpressure chamber R2 in response to the driver's pedal operation. Since communication valves 26P and 26S are open, backpressure chamber R2 communicates with wheel cylinders 8. Brake fluid flowing from backpressure chamber R2 flows through third hydraulic line 13 into first hydraulic line 11P. This flow of brake fluid into wheel cylinders 8 exerts pressure on them. In other words, brake fluid from backpressure chamber R2 of stroke simulator 22 operated by the driver's pedal effort, supplied via third hydraulic line 13 into first hydraulic line 11P (11B), exerts pressure on wheel cylinders 8. The force against piston 220 exerted by spring 221 and backpressure (hydraulic pressure equivalent to the wheel cylinder hydraulic pressure) creates pedal reaction force.

Figure 3:
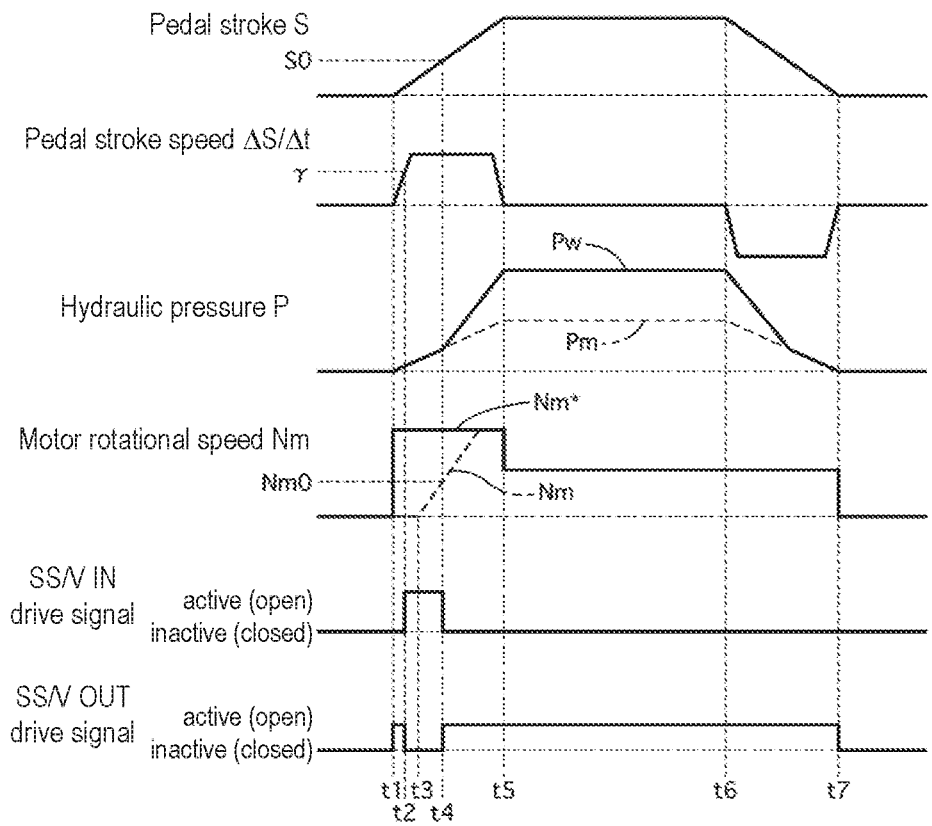
FIG. 3 is a time chart of the control of wheel cylinder hydraulic pressure of the first embodiment.

FIG. 3 is a time chart of the operation of system 1 in the driver's emergency brake operation. Before time t1, the driver does not perform brake operation, thus, there is no pedal stroke. Wheel-cylinder hydraulic pressure controller 104 does not perform hydraulic pressure control; thus, master cylinder hydraulic pressure Pm, wheel cylinder hydraulic pressure Pw, motor rotational speed Nm are all zero. Since brake operating condition detector 101 detects non-braking operation, wheel-cylinder hydraulic pressure controller 104 closes SS/V OUT 24 and SS/V IN 23 and puts stroke simulator 22 inactive. At time t1, the driver starts brake operation and continues to step on brake pedal 2 until time t5. From t1, pedal stroke S rises from zero. From t1 to t2, pedal stroke speed ΔS/Δt is less than set value γ (threshold for emergency braking); thus, the process in the flowchart of FIG. 2 proceeds from step S1 to S4, and wheel-cylinder hydraulic pressure controller 104 performs normal wheel cylinder pressure control. That is, command value Nm* for the rotational speed of motor 7*a* is set to a large fixed value. Cutoff valve 21 is closed and SS/V IN 23 is closed and SS/V OUT 24 is opened. Due to a delay in control of motor 7*a* (response delay), the actual value Nm has not reached the command value Nm* for motor rotational speed, the actual value Nm of motor rotational speed has not risen and remains zero. In this state, pump 7 is not in operation and wheel cylinder fluid pressure Pw hardly rises.

At t2, pedal stroke speed ΔS/Δt exceeds γ. Pedal stroke S is less than or equal to S0 and motor rotational speed Nm (actual value) is Nm0 or less; thus, the process goes from step S1 to S2 and to S3 and auxiliary pressure controller 105 performs auxiliary pressure control. With command value Nm* for motor rotational speed at the fixed value and cutoff valve 21 closed, SS/V IN 23 is opened and SS/V OUT 24 is closed. This causes the amount of brake fluid, corresponding to pedal stroke S, flowing from backpressure chamber R2 of stroke simulator 22 in response to the driver's braking operation, to flow via third hydraulic line 13 into first hydraulic line 11P. This flow puts pressure on wheel cylinders 8. Wheel cylinder hydraulic pressure Pw represents the difference between master cylinder hydraulic pressure Pm and the hydraulic pressure corresponding to the urging force of the spring 221 (pedal reaction force during normal control) and increases with increasing master cylinder hydraulic pressure Pm. At t3, actual value Nm of rotational speed of motor 7a begins to rise from zero. Pump 7 stars operating to send brake fluid into first hydraulic line 11. Since actual value Nm is far less than motor rotational speed command value Nm* up to time t4, wheel cylinder hydraulic pressure Pw arising from brake fluid pumped out of pump 7 increases only slightly.

At t4, pedal stroke S exceeds S0, or motor rotational speed Nm (actual value) exceeds Nm0. The process thus goes from step S1 to S2 and to S4, and wheel-cylinder hydraulic pressure controller 104 again performs normal wheel cylinder pressure control. Since actual value Nm of motor rotational speed is greater than Nm0, the amount of brake fluid pumped by pump 7 becomes sufficient to add pressure to wheel cylinders 8. Wheel cylinder hydraulic pressure Pw is brought up to a value greater than master cylinder hydraulic pressure Pm (boost control) and rises steeply than master cylinder hydraulic pressure Pm.

At t5, the driver stops stepping on brake pedal 2 any farther and holds the amount of pedal depression. This puts the normal wheel cylinder pressure control to an end. From t5 to t6, pedal stroke S is held at a constant value. Wheel-cylinder hydraulic pressure controller 104 controls hydraulic pressure control unit 6 to hold wheel cylinder hydraulic pressure Pw. Command value Nm* of motor rotational speed is lowered compared with that during the increase of wheel cylinder hydraulic pressure Pw (wheel cylinder pressure control) and is held at a low set value. At t6, the driver releases brake pedal 2, causing pedal stroke S to decrease up to t7. Meanwhile, wheel-cylinder hydraulic pressure controller 104 controls hydraulic pressure control unit 6 to reduce wheel cylinder hydraulic pressure Pw. Command value Nm* of motor rotational speed is held to the low set value. At t7, pedal stroke S reaches zero, putting the brake operation to an end. Wheel-cylinder hydraulic pressure controller 104 thus ends the hydraulic pressure control. As before t1, command value Nm* of motor rotational speed is set to zero and SS/V OUT 24 and SS/V IN 23 are closed.

From t2 to t4, rotational speed Nm of motor 7a (the performance of pump 7a to supply) is not sufficient to generate wheel cylinder hydraulic pressure Pw for an emergency brake operation, although pump 7 (motor 7a) is running, and pedal stroke S is small (the amount of brake fluid required for wheel cylinder pressurization is large while required force is small). During this time interval, the wheel cylinder pressure control with the aid of pump 7 is augmented by auxiliary pressure control utilizing the force on brake pedal 2. From t4 to t5, rotational speed Nm of motor 7a (the performance of pump 7 to supply) becomes sufficiently large or pedal stroke S increases (force required for wheel cylinder pressurization is large while the amount of braked fluid required is small). During this time interval, the auxiliary pressure control is terminated, and only the wheel cylinder pressure control with the aid of the pump 7 is performed. In FIG. 3, pedal stroke S exceeds set value S0 at the time (time t4) when motor rotational speed Nm exceeds set value Nm0; however, there may be a time lag between these two events.

Wheel-cylinder hydraulic pressure controller 104 has antilock controller 106. Antilock controller 106 reads the speed of each of wheels FL to RR as vehicle information and detects and monitors the slip condition of wheels FL to RR. When any of wheels FL to RR is determined to have a lockup tendency while braking force is applied to wheels FL to RR (e.g., during the driver's braking operation), that is, when the degree of slip of that wheel is determined to be excessive, wheel-cylinder hydraulic pressure controller 104 intervenes in hydraulic control (boost control) for brake operation and increases or decreases the hydraulic pressure in the wheel cylinder 8 at the wheel with an excessive degree of slip, with cutoff valve 21 closed. This control brings the degree of slip of that wheel to a proper value. More specifically, with cutoff valve 21 closed, communication valve 26 opened, and pressure regulating valve 27 closed, pump 7 is actuated. This control enables a desired amount of brake fluid to flow from reservoir tank 4 via inlet hydraulic line 15, pump 7, outlet hydraulic line 16, and first hydraulic line 11 into the wheel cylinder 8. At this stage, if a hydraulic-pressure command for the wheel cylinder 8 under control is to increase the hydraulic pressure, SOL/V IN 25 on that wheel cylinder 8 is opened, and SOL/V OUT 28 is closed, so as to bring brake fluid into the wheel cylinder 8 for pressure increase therein. If a hydraulic pressure command for the wheel cylinder 8 is to reduce the hydraulic pressure, SOL/V IN 25 on that wheel cylinder 8 is closed, and SOL/V OUT 28 is opened, so as to bring brake fluid in the wheel cylinder 8 into inlet hydraulic line 15 for pressure decrease. If a hydraulic-pressure command for the wheel cylinder 8 is to hold the hydraulic pressure, SOL/V OUT 28 and SOL/V IN 25 on the wheel cylinder 8 are closed, thereby holding the hydraulic pressure in the wheel cylinder 8.

Wheel-cylinder hydraulic pressure controller 104 (e.g., antilock controller 106) controls stroke simulator 22 by regulating the operation of SS/V IN 23 and SS/V OUT 24 in accordance with the operating condition of antilock control during brake-by-wire control accompanying the driver's braking operation. This enables control of the stroke of piston 52P of master cylinder 5 and active control of operation of brake pedal 2. More specifically, when brake operating condition detector 101 detects braking operation, cutoff valve 21 is closed, and the hydraulic pressure generated in first hydraulic line 11 by pump 7 is used to control the hydraulic pressure on wheel cylinders 8. During this control, to reduce the wheel cylinder pressure under antilock control, SS/V OUT 24 is closed and SS/V IN 23 is opened. To increase the wheel cylinder hydraulic pressure under antilock control, SS/V OUT 24 is opened and SS/V IN 23 is closed. To hold the wheel cylinder hydraulic pressure under antilock control, SS/V OUT 24 and SS/V IN 23 are closed. The pressure increase, decrease, and hold may be determined on the basis of whether or not the total required amount of brake fluid (hereinafter "the required fluid amount") calculated from the required brake forces for the plurality of wheels FL to RR (target wheel cylinder hydraulic pressure) is on the decrease or increase. The purpose of this determination it to improve the accuracy with which variations in brake fluid amount used in the whole system 1 under antilock control can be determined. For example, a decreasing total value of required fluid amount can be recognized as a reduction in wheel cylinder hydraulic pressure exerted by the whole system 1.

The operation of system 1 will now be described with comparison with the prior art. There are known brake control systems that are capable of cutting off the communication between the master cylinder and wheel cylinders, comprise a mechanism for simulating pedal reaction force (stroke simulator) in addition to the wheel cylinders, and are capable of pressuring the wheel cylinders with the aid of a hydraulic pressure source, apart from the master cylinder. Such a system normally cuts off the communication between the master cylinder and wheel cylinders and creates pedal reaction force with the aid of a stroke simulator while using a hydraulic pressure source to apply pressure to the wheel cylinders. To allow for a rapid application of pressure to the wheel cylinders, for example by the driver's rapid brake operation, provision has to be made to improve the performance of actuators for a hydraulic pressure source to meet required responsiveness of wheel cylinder pressurization with the aid of the hydraulic pressure source. This improvement may require use of a large or expensive actuator.

In contrast, to improve the pressure response in wheel cylinders 8, system 1 of this embodiment uses stroke simulator 22 as a hydraulic pressure source (which operates in response to the driver's brake operation, to simulate pedal reaction force), independent of pump 7, to supply brake fluid to wheel cylinders 8. While the driver is exerting pedal effort, stroke simulator 22 discharges brake fluid from backpressure chamber R2 on the side opposite to the side of stroke simulator 22 which receives a flow of brake fluid from master cylinder 5. This outflow of brake fluid is delivered to wheel cylinders 8 to pressurize them. In this way, the rate of pressurization in wheel cylinders 8 can be improved even when the rate of pressurization (pressure response) in wheel cylinders 8 the pump 7 can achieve is insufficient. This eliminates the need for a large or expensive actuator for pump 7 to improve the performance of motor 7a. The pressure response in wheel cylinders 8 is improved by using brake fluid discharged from stroke simulator 22 under the action of the driver's pedal effort (brake fluid supplied independent of pump 7). This also eliminates, for example, the need for enlarging motor 7a and can improve packaging and layout of system 1 in a vehicle. This embodiment uses pump 7 as a hydraulic pressure source and motor 7a (electric motor) as an actuator for the hydraulic pressure source. However, the hydraulic pressure source may be any fluid mechanism so long as it is capable of converting mechanical energy (motive power) into brake fluid pressure and holding the pressure. The hydraulic pressure source is not limited to a pump and may be, for example, a piston cylinder, an accumulator, or the like. The actuator may be any mechanism (motor) so long as it is capable of converting an input of electrical energy (electric power) into physical motion (motive power) to actuate the hydraulic pressure source, and is not limited to a motor (electric motor).

Although the destination of brake fluid discharged from stroke simulator 22 is switched from the reservoir tank 4 to wheel cylinders 8, the operation of stroke simulator 22 (the stroke of piston 220) remains unimpeded. In other words, stroke simulator 22 has the function of a brake fluid source to supply brake fluid to wheel cylinders 8, as well as its intrinsic function of simulating pedal reaction force. This prevents spongy pedal feel.

In this embodiment, the supply of brake fluid from stroke simulator 22 to wheel cylinders 8 is achieved by providing hydraulic pressure control unit 6 (first unit 61) with third hydraulic line 13. The mere addition of the single third hydraulic line 13 is enough to achieve the above-described function, without making system 1 larger or more complex. In this embodiment, third hydraulic line 13 is directly connected to a point between cutoff valve 21P in first hydraulic line 11P and wheel cylinders 8. Instead, third hydraulic line 13 may be connected indirectly to first hydraulic line 11P. For example, third hydraulic line 13 may be connected to outlet hydraulic line 16. In this embodiment, the length of the fluid path extending from backpressure chamber R2 to wheel cylinders 8 is shortened by connecting third hydraulic line 13 directly to first hydraulic line 11P. This simplifies the fluid piping structure of this fluid path and improves the pressure response in wheel cylinders 8. In a structure like hydraulic pressure control unit 6 of this embodiment, consisting of two units (units 61 and 62), third hydraulic line 13 is housed in one unit: unit 61. This eliminates the need for using a brake line forming third hydraulic line 13 to connect units 61 and 62 and thus simplifies the overall structure of system 1.

Backpressure chamber R2 of stroke simulator 22 is connected to reservoir tank 4 by fourth hydraulic line 14. This connection of backpressure chamber R2 to reservoir tank 4, a lower pressure section, ensures smooth operation of stroke simulator 22. A switch is provided to switch the path of brake fluid from backpressure chamber R2 between the path of brake fluid leading to reservoir tank 4 via fourth hydraulic line 14 and the path of brake fluid leading to first hydraulic line 11P (11B) via third hydraulic line 13. This enables the destination of brake fluid leaving stroke simulator 22 to be easily switched from the reservoir tank 4 side to the wheel cylinder 8 side and vice versa. This improves the pressure response in wheel cylinders 8 and pedal feel.

Third hydraulic line 13 is provided with SS/V IN 23. SS/V IN 23 forms (part of) the switch. The operation of SS/V IN 23 is controlled to change the state of communication through third hydraulic line 13, thereby switching on and off the supply of brake fluid from backpressure chamber R2 to wheel cylinders 8 to switch on and off auxiliary pressure control, as required. In short, SS/V IN 23 is fitted to establish and block the communication between backpressure chamber R2 and first hydraulic line 11P. SS/V IN 23 is closed to cut off the communication between backpressure chamber R2 and first hydraulic line 11P (11B) and thus make the flow of brake fluid from backpressure chamber R2 unavailable for auxiliary pressure control. This prevents (or terminates) auxiliary pressure control. In the other hand, opening SS/V IN 23 establishes the communication between backpressure chamber R2 and first hydraulic line 11P (11B) to make brake fluid from backpressure chamber R2 available for auxiliary pressure control to perform auxiliary pressure control. SS/V IN 23 may be of normally open type.

Fourth hydraulic line 14 is provided with SS/V OUT 24. The operation of SS/V OUT 24 is controlled to change the state of communication through fourth hydraulic line 14 to switch on and off the operation of stroke simulator 22, as required. In short, SS/V OUT 24 is fitted to establish and block the communication between backpressure chamber R2 and inlet hydraulic line 15 (reservoir tank 4). SS/V OUT 24 is closed to block the communication between backpressure chamber R2 and reservoir tank 4, thereby preventing the flow of brake fluid from backpressure chamber R2 to reservoir tank 4. This prevents piston 220 from undergoing a stroke and keeps stroke simulator 22 inactive. This prevents piston 220 of stroke simulator 220 from moving in response to the driver's pedal operation during a brake application by pedal effort and allows efficient supply of brake fluid from master cylinder 5 to wheel cylinders 8. It is therefore possible to prevent a decrease in wheel cylinder hydraulic pressure generated by the driver's braking effort. In the event of failure of system 1, SS/V OUT 24 is closed to make stroke simulator 22 inactive and prevents a decrease in wheel cylinder hydraulic pressure generated by pedal stepping (pedal effort). SS/V OUT 24 used in this embodiment is of normally closed type. In the event of power source failure, SS/V OUT 24 is closed to bring about the above-described effect. Cutoff valve 21 is of normally open type and communication valve 23 of normally closed type. In the event of power source failure, the two hydraulic brake systems are made independent of each other to independently apply wheel cylinder hydraulic pressure in response to pedal effort. This improves failsafe function. When SS/V OUT 24 is opened, backpressure chamber R2 communicates with reservoir tank 4 to allow brake fluid to flow from backpressure chamber R2 to reservoir tank 4. This enables the piston 220 to undergo a stroke and thus makes stroke simulator 22 active.

S/V OUT 24 forms (part of) the switch. The operation of SS/V OUT 24 is controlled to change the state of communication through fourth hydraulic line 14, thereby facilitating auxiliary pressure control. More specifically, SS/V OUT 24 is closed to cut off the communication between backpressure chamber R2 and reservoir tank 4 to make a larger amount of brake fluid leaving backpressure chamber R2 available for auxiliary pressure control. When SS/V OUT 24 is opened, the communication between backpressure chamber R2 and reservoir tank 4 is established to reduce the amount of brake fluid leaving backpressure chamber R2 for auxiliary pressure control.

The auxiliary pressure control can be easily performed by switching the operating state of SS/V OUT 24 and SS/V IN 23. The combined operation of SS/V OUT 24 and SS/V IN 23 can be controlled, as required, to readily switch between the state of operation of stroke simulator 22 for merely creating pedal reaction force (wheel cylinder pressure control with the aid of pump 7 alone) and the state of operation of stroke simulator 22 for (also) improving the responsiveness of wheel cylinder pressurization (auxiliary pressure control). More specifically, when SS/V OUT 24 is opened, SS/V IN 23 is closed to prevent the hydraulic pressure on the first hydraulic line 11P side from acting on backpressure chamber R2, thereby making the operation of stroke simulator 22 smooth. When SS/V IN 23 is opened, SS/V OUT 24 is closed to prevent brake fluid leaving backpressure chamber R2 from being discharged onto inlet hydraulic line 15 (reservoir tank 4) side and increase the supply of brake fluid via first hydraulic line 11P into wheel cylinders 8, thereby improving the pressure response in wheel cylinders 8. If SS/V OUT 24 is already used as a solenoid valve for switching on and off the operation of stroke simulator 22, the mere addition of another solenoid valve, namely, SS/V IN 23 is sufficient to achieve the above-described function, eliminating the need for an additional component or making the system larger or more complex.

SS/V OUT 24 is disposed, not on the positive pressure chamber R1 (second hydraulic line 12) side of stroke simulator 22, but on the backpressure R2 (fourth hydraulic line 14) side, this arrangement improves the pedal feel experienced at the end of auxiliary pressure control. If SS/V OUT 24 were disposed on the positive pressure chamber R1 side (in second hydraulic line 12), the following problem would conceivably occur. In such arrangement, it might appear possible to achieve auxiliary pressure control by supplying brake fluid from master cylinder 5 to wheel cylinders 8, with SS/V OUT 24 closed and cutoff valve 21 open. In this manner, the supply of brake fluid resulting from the driver's pedal operation (independent of pump 7) would be used to improve the pressure response in wheel cylinders 8. When the auxiliary pressure control is terminated and followed by normal wheel cylinder pressure control, cutoff valve 21 would be closed and SS/V OUT 24 opened. During the auxiliary pressure control, however, brake fluid would not be supplied to stroke simulator 22 so that stroke simulator 22 would remain inactive. As such, at the time of transition from the auxiliary to normal control, the amount of operation of stroke simulator 22 (the stroke of piston 220, or the amount of deformation of spring 221) would not correspond to the pedal stroke at the time of the transition. For this reason, the relation between the pedal stroke at the time of transition and pedal effort (F-S characteristic) would be different from that when the auxiliary pressure control is not performed (during normal braking). After the transition, the amount of brake fluid present upstream of cutoff valve 21P and on the positive pressure chamber R1 side (brake fluid present between first fluid chamber 51P of master cylinder 5 and first hydraulic line 11P (hydraulic line 11A)/ positive pressure chamber R1 and positive pressure chamber R1) would be reduced by the amount supplied to wheel cylinders 8 before the transition, compared with the amount during the normal control. In other words, the amount of fluid present on the positive pressure chamber R1 side of stroke simulator 22 would vary when the transition takes place, causing the F-S characteristic to fluctuate. Thus the driver would experience discomfort.

In this embodiment, at the beginning and end of auxiliary pressure control, piston 220 of stroke simulator 22 continues to undergo a stroke corresponding to the amount of brake fluid flowing from master cylinder 5 in response to braking operation. That means that not only during normal wheel cylinder pressure control with the aid of pump 7 but also during auxiliary pressure control, brake fluid continues to flow into stroke simulator 22 (positive pressure chamber R1) to operate stroke simulator 22. As such, the amount of operation of stroke simulator 22 (the stroke of piston 220, or the amount of deformation of spring 221) at the end of auxiliary pressure control corresponds to the pedal stroke at the end of the control. The amount of brake fluid entrapped between first fluid chamber 51P of master cylinder 5 and first hydraulic line 11A/second hydraulic line 12 and the positive pressure chamber R1 (the space between pistons 52P, 52S of master cylinder 5, cutoff valve 21P, and piston 220 of stroke simulator 22) remains unchanged at the end of the control. Since the amount of brake fluid on the positive pressure chamber R1 side remains unchanged, the F-S characteristic does not fluctuate at the end of the control. This improves pedal feel, hardly giving discomfort.

The responsiveness of pressurization in the wheel cylinders 8 by pump 7 becomes considerable insufficient when the driver applies the brakes in an emergency situation, in which the rate of braking rises rapidly, which makes it extremely difficult to apply pressure to wheel cylinders 8 to meet the demand for this rapid brake operation. In such cases, the auxiliary pressure control is implemented to improve the pressure response in wheel cylinders 8. More specifically, provision is made to perform auxiliary pressure control if the driver's brake operation is a predetermined emergency operation and otherwise perform normal wheel cylinder pressure control with the aid of pump 7. The determination of whether it is an emergency braking operation requires means for measuring or estimating the rate of braking. One conceivable means would be to measure or estimate the change in hydraulic pressure (rate of change) at a predetermined point in hydraulic pressure control unit 6 and use the measured or estimated change to determine or estimate the rate of braking. In general, however, brake pedals (brake actuating members) or the like are provided with an idle travel; there is a certain time lag between the displacement of the brake pedal and the instant when hydraulic pressure actually reaches its destination. As such, a change in hydraulic pressure is preceded by the displacement of the brake pedal (according to a sensor reading). This phenomenon becomes particularly conspicuous in an emergency braking operation. To prevent this, this embodiment measures or estimates the rate of braking operation on the basis of the displacement (pedal travel) of the brake pedal 2, rather than the change in hydraulic pressure. This leads to (prompt) determination at earlier state of whether it is an emergency operation and thus improves the pressure response in wheel cylinders 8 effectively.

The responsiveness of pressurization in the wheel cylinders 8 by pump 7 is notably insufficient when the performance of pump 7, supplying brake fluid to wheel cylinders 8, has not yet reached a sufficient level, that is, when the rotational speed of motor 72, the actuator of pump 7, is low. In such cases, this embodiment performs auxiliary pressure control to improve the pressure response in wheel cylinders 8 effectively in the following manner. When a measured or estimated rotational speed Nm of motor 7a is lower than or equal to set value Nm0, auxiliary pressure control is performed. Set value Nm0 may be such a value that the performance of pump 7 in supplying brake fluid (pressure) is sufficient to apply enough pressure to wheel cylinders 8. For example, set value Nm0 is set to a rotational speed that is sufficient for pump 7 to generate a wheel-cylinder hydraulic pressure greater than master cylinder hydraulic pressure. Especially at the beginning of a brake pedal stepping operation when the pedal stroke rises from zero, it is necessary to set motor 7a into motion and increase its rotational speed. However, there is a delay between an increase in command value for motor rotational speed and an actual rise in motor rotational speed. Such a delay in response for control (time lag) increases the possibility of failing to bring the performance of pump 7 to a sufficient level to perform wheel cylinder pressure control. When pump 7 has not reaches a sufficient performance level of supplying brake fluid (pressure), auxiliary pressure control is performed to apply pressure to wheel cylinders 8 to improve the pressure response in wheel cylinders 8 effectively.

In the auxiliary pressure control, wheel cylinder hydraulic pressure (or its equivalent hydraulic pressure) acts on backpressure chamber R2 of stroke simulator 22. It is thus necessary to apply greater pedal effort for the same pedal stroke than that during the normal wheel cylinder pressure control in which atmospheric pressure (a low pressure in reservoir tank 4) acts on backpressure chamber R2. For this reason, the F-S characteristics are slightly different from that during the normal wheel cylinder pressure control (normal control). Since the auxiliary pressure control takes place when pedal effort is being applied (in a dynamic situation where pedal effort and pedal stroke vary), the difference in the characteristics is permissible to some extent (less likely to give discomfort to the driver). However, an extremely long continuous auxiliary pressure control may give the driver discomfort and deteriorate pedal feel. To prevent this, this embodiment terminates auxiliary pressure control at the instant when motor rotational speed Nm exceeds set value Nm0 (that is, at early stage). Since the auxiliary pressure control ends before wheel cylinder hydraulic pressure acting on backpressure chamber R2 becomes excessively high, pedal feel deterioration can be avoided effectively.

The condition that the motor rotational speed Nm be lower than or equal to set value Nm0 may be replaced with a condition that time (according to a timer) that has elapsed since an increase in motor rotational speed command value (in response to a brake pedal stepping operation) be shorter than or equal to a set value. In other words, when the time elapsed is shorter than or equal to the set value, auxiliary pressure control is performed (and when the time elapsed becomes longer than or equal to the set value, the auxiliary pressure control ends). This set value for a timer is set to a length of time required to bring the performance of pump 7 in supplying pressure, to a sufficient level (e.g., when the actual motor rotational speed becomes greater than or equal to a level sufficient for pump 7 to supply wheel cylinder hydraulic pressure greater than master cylinder hydraulic pressure). The set value may be experimentally preset, allowing for a time delay in control by motor 7a and other factors.

In general, the amount of brake fluid Q supplied to the wheel cylinders and the wheel cylinder hydraulic pressure P are so related that the rate $\Delta P/\Delta Q$ (fluid stiffness) of the increase in wheel cylinder hydraulic pressure P relative to the increase in fluid amount Q is low in a certain low pressure region and the $\Delta P/\Delta Q$ is high above the low pressure region, or in a non-low pressure region. In the low pressure region, the wheel cylinder hydraulic pressure has been low and a large amount of brake fluid is required to increase the wheel cylinder hydraulic pressure, although force required to increase the wheel cylinder hydraulic pressure is low. In the non-low pressure region, the wheel cylinder hydraulic pressure is developed to some extent and large force is required to increase the wheel cylinder hydraulic pressure, although the amount of brake fluid required to increase the wheel cylinder hydraulic pressure is small. The responsiveness in pressurization in the wheel cylinders by the pump 7 is conspicuously insufficient in the low pressure region. In this embodiment, auxiliary pressure control is performed in this low pressure region to improve the pressure response in wheel cylinders 8 effectively.

More specifically, when a pedal stroke S measured is less than or equal to set value S0, auxiliary pressure control is performed. In auxiliary pressure control, an amount of brake fluid corresponding to a stroke of piston 52 of master cylinder 5 (piston 220 of stroke simulator 22) is delivered to wheel cylinders 8. In the low pressure region where pedal stroke S is lower than or equal to set value S0, force required to increase the wheel cylinder hydraulic pressure is relatively low, and pedal effort is enough to increase the wheel cylinder hydraulic pressure sufficiently. It is therefore possible to improve the pressure response in wheel cylinders 8. The low and non-low pressure regions and set value S0 of pedal stroke S for distinguishing between the two regions may be preset by experiment or the like. The beginning of a brake pedal stepping operation when the pedal stroke rises from zero, that is, when the wheel cylinder hydraulic pressure rises from zero, corresponds, in particular, to the low pressure region. This means that the wheel cylinder hydraulic pressure is still low and the amount of brake fluid required to increase the wheel cylinder hydraulic pressure is large. In such cases, auxiliary pressure control is performed to improve the pressure response in the wheel cylinders 8 effectively. In the non-low pressure region where force required to increase the wheel cylinder hydraulic pressure is large due to large fluid stiffness (although the amount of brake fluid required is small), wheel cylinders 8 are pressurized by pump 7, which can apply grater force than pedal stepping force to develop hydraulic pressure. This makes it possible, for example, to bring the wheel cylinder hydraulic pressure to a value greater than the master cylinder hydraulic pressure.

Since, as described above, an excessively long continuous auxiliary pressure control may give the driver discomfort, provision is made in this embodiment to end the auxiliary pressure control (at early stage) when pedal stroke S exceeds set valve S0 (or when the amount of fluid Q exceeds a set value). By ending the auxiliary pressure control before the wheel cylinder hydraulic pressure acting on backpressure chamber R2 becomes excessively high, pedal feed deterioration can be prevented effectively.

Instead of a pedal stroke measured, a wheel cylinder hydraulic pressure measured by hydraulic sensor 92 may be used to determine whether it is in the low or non-low pressure region. This direct observation of the wheel cylinder hydraulic pressure enables a more reliable determination of whether it is in the low or non-low pressure region than the observation of the pedal stroke (amount of braking) (alternatively, an estimate of wheel cylinder hydraulic pressure may be used for that purpose). More specifically, provision is made to perform auxiliary pressure control when a measured or estimated wheel cylinder hydraulic pressure is less than or equal to a set value, and perform normal wheel cylinder pressure control by pump 7 when the measured or estimated wheel cylinder hydraulic pressure is greater than the set value. The use of a threshold for distinguishing between the low and non-low pressure region as the set value of wheel cylinder hydraulic pressure can bring about the same effect as described above. In comparison, this embodiment takes a detected pedal stroke S (amount of braking) into account to determine whether it is in the low or the non-low pressure region. This makes it possible to make a (more prompt) determination at an earlier stage than when taking a measured or estimated wheel cylinder hydraulic pressure into account for the determination, since, as described above, a pedal stroke (as a sensor reading) precedes a change in hydraulic pressure. It is therefore possible to improve the pressure response of in wheel cylinders 8.

As described above, provision is made to perform auxiliary pressure control when pedal stroke S is less than or equal to set value S0 and the rotational speed Nm of motor 7a is less than or equal to Nm0. When piston 220 undergoes a small stroke, stroke simulator 22 is adapted to apply pressure to the wheel cylinders by supplying them with brake fluid from backpressure chamber R (and producing reaction force to the driver's brake operation) as piston 220 moves toward backpressure chamber R. The reason is that pedal stroke S being less than or equal to S0 means that the stroke of piston 220 (the amount of displacement from its initial position) is small. Nm being less than equal to Nm0 means that pedal stroke S is small. For a large stroke of piston 220, stroke simulator 22 is adapted to produce reaction force to the driver's brake operation. As piston 220 moves toward backpressure chamber R, spring 221 of stroke simulator 22 applies urging force to piston 220 to produce reaction force to the driver's brake operation. The urging force (spring constant) of spring 221 is set to a value that enables spring 221 to produce reaction force to the driver's brake operation, according to pedal stroke S, at least when piston 220 undergoes a large stroke (when spring 221 experiences a large compression).

Hydraulic pressure control unit 6 of this embodiment is capable of putting stroke simulator 22 into operation under the action of hydraulic pressure generated by pump 7 by controlling the operation of SS/V OUT 24 and SS/V IN 23, so as to impart a stroke to piston 52P of master cylinder 5, even during brake-by-wire control in which master cylinder 5 is cut off from wheel cylinders 8 by closing cutoff valve 21. That is, by closing SS/V OUT 24 and opening SS/V IN 23, brake fluid is supplied to backpressure chamber R2 of stroke simulator 22 through third hydraulic line 13 from first hydraulic line 11P (hydraulic line 11B), which is pressurized by pump 7. This causes piston 220 of stroke simulator 22 to undergo a stoke toward positive pressure chamber R1 and thus causes hydraulic pressure to be transmitted to first fluid chamber 51 of master cylinder 5, such that pedal reaction forces rises and piston 52P is forced back toward the pushrod 30 side, reducing a pedal stroke. In other words, brake pedal 2 reverses the direction of its movement. This effect can also be obtained by connecting third hydraulic line 13 to outlet hydraulic line 16. By opening SS/V OUT 24 and closing SS/V IN 23, backpressure chamber R2 of stoke simulator 22 is cut off from first hydraulic line 11P (hydraulic line 11B) and is connected to inlet hydraulic line 15 (reservoir tank 4). This causes piston 220 of stroke simulator 22 to undergo a stroke toward backpressure chamber R2, thereby discharging brake fluid from backpressure chamber R2. This causes the hydraulic pressure in first fluid chamber 51P of master cylinder 5 to reduce, which results in a decrease in pedal reaction force and a movement of piston 52P toward first fluid chamber 51P, increasing the pedal stroke. In other words, the brake pedal 2 reverses the direction of its movement and starts moving in the direction in which it is being depressed. By closing both SS/V OUT 24 and SS/V IN 23, pedal reaction force and pedal stroke are prevented from changing, thereby holding brake pedal 2 in substantially the same position.

During brake-by-wire control, the driver may not perceive intervention of antilock control, since, with master cylinder 5 cut off from wheel cylinders 8, changes in hydraulic pressure in the wheel cylinders 8 arising from the ongoing antilock control are not transmitted to master cylinder 5. In this embodiment, hydraulic pressure generated by pump 7 is used, with SS/V OUT 24 and SS/V IN 23 being actuated, to impart a stroke to piston 52P (to control the position of piston 52P) when antilock control is being performed by antilock controller 106 during wheel cylinder hydraulic pressure control accompanying brake operation (brake-by-wire control). This causes brake pedal 2 to move back and forth (pulse), helping the driver perceive the ongoing antilock control. By properly controlling the operation of valves 23 and 24 in accordance with the antilock control (in accordance with the state of wheel cylinders 8 under hydraulic control), pedal stroke and pedal reaction force can be properly controlled. For example, to reduce wheel cylinder hydraulic pressure under antilock control, SS/V OUT 24 is closed and SS/V IN 23 is opened, so as to reverse the direction of movement of brake pedal 2 and move it back toward its initial position. This makes it possible to create a response of brake pedal 2 that approximates a response created by a conventional brake control system, which transmits changes in hydraulic pressure in the wheel cylinders during antilock control to the master cylinder (brake pedal). The pedal feel so created thus hardly gives discomfort. During antilock control, brake pedal 2 is moved by the distance corresponding to the amount of brake fluid required by wheel cylinders 8 (according to road frictional force). This allows the driver to use the position of the brake pedal 2 to estimate road frictional force (adhesion limit). For example, by properly setting the length of time in which valves 23 and 24 open, pedal stroke is made to decrease with decreasing road frictional force. At the end of antilock control, SS/V OUT 24 is opened and SS/V IN 23 is closed. In this way, the pedal feel experienced during normal braking can be provided immediately upon the end of the antilock control. Thus the pedal feel hardly gives discomfort.

Embodiment 2

[Structure]

Figure 4:
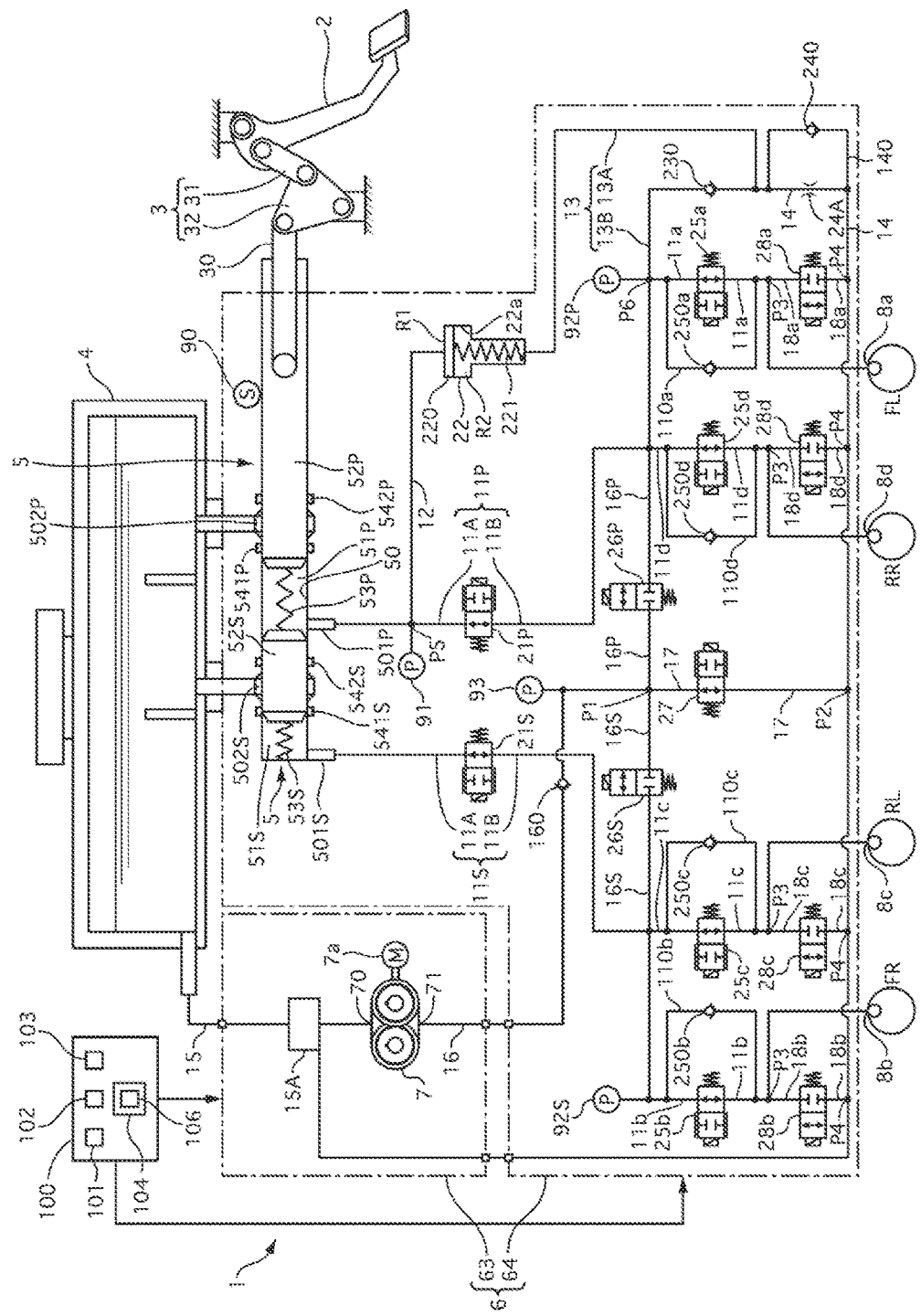
FIG. 4 is a schematic view of a brake control system of a second embodiment.

FIG. 4 schematically shows the structure of system 1 of the second embodiment. This system 1 is different from that of the first embodiment, in that check valve 230 is used, instead of stroke simulator IN valve SS/V IN 23 (solenoid valve), in third hydraulic line 13.

Hydraulic pressure control unit 6 comprises first unit 63 and second unit 64. First unit 63 is a pump unit comprising pump 7 and motor 7a. Second unit 64 is a valve unit housing valves 21 for opening and closing hydraulic line 11, etc. Second unit 64 comprises stroke simulator 22 and sensors 90 to 93 and is formed integral with master cylinder 5. Second unit 64 is integrated with reservoir tank 4. In other words, master cylinder 5 and stroke simulator 22 are housed in the same housing to form a master cylinder unit. Reservoir tank 4 and pump 7 are integrated with the master cylinder unit to form a single unit as a whole. The valve unit is integrated with the master cylinder unit to form a single unit as a whole. Master cylinder 5, stroke simulator 22, valve 21, etc., are housed in the same housing.

First unit 63 is provided therein with fluid reservoir 15A of a set volume above inlet hydraulic line 15. Fluid reservoir 15A is a reservoir inside hydraulic pressure control unit 6. Fluid reservoir 15A is located in first unit 63 near a point of connection (on the vertically top side of first unit 63) with a brake pipe forming inlet hydraulic line 15. First and second pressure reducing hydraulic lines 17 and 18 are connected to fluid reservoir 15A. Pump 7 draws brake fluid from reservoir tank 4 via fluid reservoir 15A. Brake fluid in fourth hydraulic line 14 returns via fluid reservoir 15A to reservoir tank 4.

Check valve 230 is a one-way valve that admits only the flow of brake fluid from the backpressure chamber R2 side to the first hydraulic line 11 side. Third hydraulic line 13 is divided by check valve 230 into hydraulic line 13A on the backpressure chamber R2 side and hydraulic line 13B on the first hydraulic line 11 side. Fourth hydraulic line 14 is provided with constriction 24A, instead of a solenoid valve (stroke similar OUT valve SS/V OUT 24). Constriction 24 is a resisting portion having a set fluid path resistance. The amount constricted by constriction 24 (amount of reduction in flow path cross section) is set larger than the amount constricted by check valve 230 when it is opened. In other words, the flow path resistance of constriction 24A is set larger than that of check valve 230 when open. Constriction 24A is bypassed by bypass hydraulic line 140, which is disposed in parallel to fourth hydraulic line 14. Bypass hydraulic line 14 is provided with check valve 240 that admits only the flow from the inlet hydraulic line 15 side to the third hydraulic line 13 (hydraulic line 13B) side.

Wheel-cylinder hydraulic pressure controller 104, unlike that of the first embodiment, does not comprise auxiliary pressure controller 105. While wheel-cylinder hydraulic pressure controller 104 performs normal boost control (wheel cylinder pressure control by pump 7), auxiliary pressure control starts automatically (or stops automatically) In other words, wheel-cylinder hydraulic pressure controller 104 doubles as an auxiliary pressure controller. Since other elements are the same as those of the first embodiment, description of the other elements is omitted by using the same reference numerals as those of the first embodiment.

Brake pedal 2 and master cylinder 5 are provided therebetween with booster 3. Booster 3 connects brake pedal 2 and pushrod 30 and boosts pedal effort and transmits it to pushrod 30. Booster 3 is capable of mechanically transmitting force between brake pedal 2 and master cylinder 5 and is a link-type booster with variable boost ratio. Booster 3 comprises a link mechanism that varies the ratio of stroke of pushrod 30 to pedal stroke (lever ratio). This link mechanism comprises first link 31 of a rod shape in side view and second link 32 of a triangular shape in side view. First link 31 is pivotally connected at one end to the root of brake pedal 2 (pedal arm). Second link 32 has a first apex rotatably supported on the vehicle body. First link 31 is pivotally connected at the other end to a second apex of second link 32. Second link 32 has a third apex pivotally connected to one axial end of pushrod 30. Pushrod 30 receives force from second link 32 and undergoes a stroke in accordance with depression of brake pedal 2. Pushrod 30 transmits pedal effort transmitted through (and boosted by) booster 3 as an axial thrust to master cylinder 5 (primary piston 52P). Stroke sensor 90 is housed in master cylinder 5 to measure the stroke of primary piston 52P (pushrod 30) as an amount of brake operation by the driver. Hydraulic pressure sensor 93, which measures pump outlet pressure, is located in outlet hydraulic line 16 between outlet 71 of pump 7 (check valve 160) and communication valve 26. Alternatively, hydraulic pressure sensor 93 may be provided in first pressure reducing hydraulic line 17 between connection point P1 with outlet hydraulic line 16 and pressure regulating valve 27. Booster 3 may be omitted or replaced with other type of booster, depending on a set lever ratio and other properties.

[Operation]

Check valve 230 and constriction 24A automatically (without being directly controlled) carries out the control that would otherwise be performed by auxiliary pressure controller 105 of the first embodiment (starts, performs, and ends auxiliary pressure control).

Third hydraulic line 13 is provided with check valve 230 that admits only the flow of brake fluid from backpressure chamber R2 to wheel cylinder 8. Check valve 230 forms (part of) a switch that switches brake fluid coming from backpressure chamber R2 between a path leading via fourth hydraulic line 14 to reservoir tank 4 and a path leading via third hydraulic line 13 to first hydraulic line 11P (11B) When the hydraulic pressure on the backpressure chamber R2 side of check valve 230 is higher than that on the first hydraulic line 11P (11B) side, check valve 230 opens to allow brake fluid from backpressure chamber R2 to flow via third hydraulic line 13 into first hydraulic line 11P (11B). This makes it possible to start and perform auxiliary pressure control automatically. When the hydraulic pressure on the first hydraulic line 11P (11B) side of check valve 230 is higher than that on the backpressure chamber R2 side, check valve 230 closes to prevent brake fluid coming from backpressure chamber R2 from flowing via third hydraulic line 13 into first hydraulic line 11P (11B). This automatically ends the auxiliary pressure control.

Fourth hydraulic line 14 is provided with constriction 24A. Forth hydraulic line 14 admits both the flow of brake fluid from backpressure chamber R2 and the flow of brake fluid from reservoir tank 4. Forth hydraulic line 14 does not have a solenoid valve or check valve that would, depending on the operating state of such a valve, impede a flow of brake fluid through fourth hydraulic line 14, and thus facilitates the flow. This makes, for example, the operation of stroke simulator 22 smooth. Constriction 24A forms (part of) the switch. Constriction 24 has a set constriction resistance. This facilitates path switching by the switch and hence auxiliary pressure control. The flow rate of brake fluid leaving backpressure chamber R2 is high in an emergency brake operation than that in a non-emergency brake operation; thus, the difference in hydraulic pressure (pressure differential)

between the backpressure chamber R2 side of constriction 24A and the reservoir tank 4 side is larger in an emergency brake operation. Given the same increase in difference in hydraulic pressure, the resultant increase in the flow rate through constriction 24A in emergency braking is smaller than that in non-emergency braking. For this reason, in emergency braking, of the amount of brake fluid leaving backpressure chamber R2, the amount of brake fluid flowing through fourth hydraulic line 14 into reservoir tank 4 is reduced to make a larger amount of brake fluid available for auxiliary pressure control. In non-emergency braking, the flow rate of brake fluid leaving backpressure chamber R2 is low and the difference in hydraulic pressure is small. This makes an increase in flow rate through constriction 24A, due to a given increase in the difference in hydraulic pressure, larger in non-emergency braking than that due to the same increase in the difference in hydraulic pressure in emergency braking. For this reason, in non-emergency braking, of the amount of brake fluid leaving backpressure chamber R2, the amount of brake fluid flowing through fourth hydraulic line 14 into reservoir tank 4 can be increased.

Figure 5:
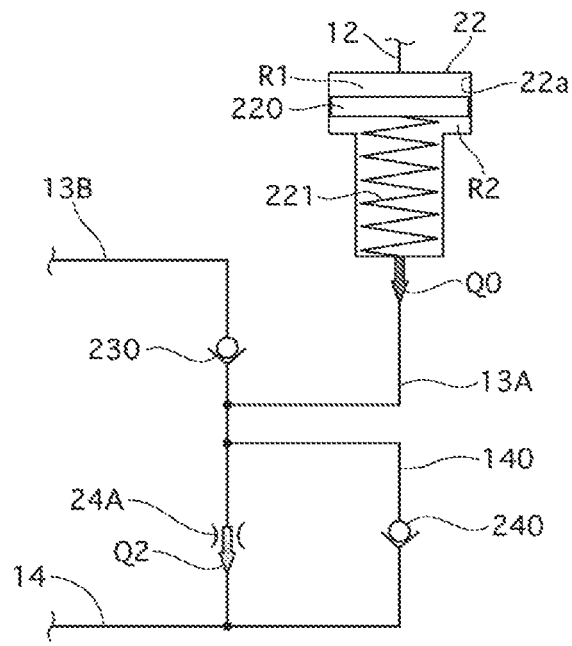
FIG. 5 is an enlarged schematic view of second to fourth hydraulic lines 12 to 14 of the second embodiment (in a non-emergency brake operation).
Figure 6:
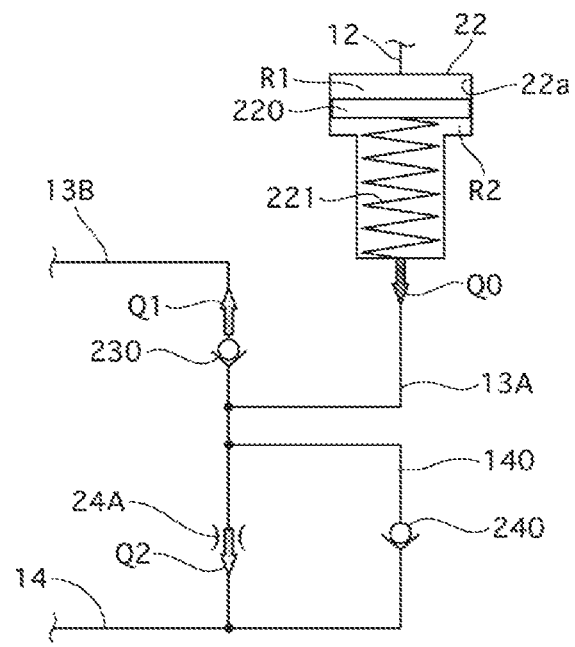
FIG. 6 is an enlarged schematic view of the second to fourth hydraulic lines 12 to 14 of the second embodiment (in an emergency brake operation).

By setting the amount constricted by constriction 24A to a value larger than that by check valve 23 when open, auxiliary pressure control can be performed effectively. The details are as follows. FIGS. 5 and 6 are enlarged schematic views of second to fourth hydraulic lines 12 to 14. In FIG. 5, the flow of brake fluid leaving backpressure chamber R2 of stroke simulator 22 in the driver's non-emergency brake operation is indicated by an arrow. FIG. 6 uses an arrow to indicate the flow of brake fluid leaving backpressure chamber R2 in the driver's emergency operation.

In normal braking (boost control), wheel-cylinder hydraulic pressure controller 104 controls the wheel cylinder hydraulic pressure to a value higher than the master cylinder hydraulic pressure corresponding to a pedal stroke, so as to attain a set boost ratio. In the driver's non-emergency brake operation (when the speed of depression of brake pedal 2 is low), the movement of piston 220 of stroke simulator 22 is not fast. This makes the pressure differential through constriction 24A very small, preventing the hydraulic pressure in hydraulic line 13A on the backpressure chamber R2 side from increasing. On the other hand, the rate of pressure increase in wheel cylinders 8 by pump 7 (pressure response) relative to the rate of brake operation is sufficiently large. This enables the wheel cylinder hydraulic pressure to rise above the master cylinder hydraulic pressure. The hydraulic pressure in hydraulic line 13B of third hydraulic line 13 on the first hydraulic line 11 is higher than that in hydraulic line 13A on the backpressure chamber R2 side. In this state, check valve 230 is closed (sealed). As shown in FIG. 5, brake fluid flowing from backpressure chamber R2 into hydraulic line 13A does not flow through check valve 230 into hydraulic line 13B and flow through constriction 24A into fourth hydraulic line 14 and then toward reservoir tank 4. The amount of brake fluid Q0 flowing from backpressure chamber R2 into hydraulic line 13A is substantially equal to the amount of brake fluid Q2 flowing through constriction 24A of fourth hydraulic line 14 toward reservoir tank 4 (Q0=Q2). In other words, auxiliary pressure control is not performed and only wheel cylinder pressure control is performed by pump 7. All of brake fluid leaving backpressure chamber R2 is released toward reservoir tank 4, so that stroke simulator 22 functions only to produce reaction force to the driver's brake operation.

In the driver's emergency brake operation (when the speed of depression of brake pedal 2 is high), the movement of piston 220 of stroke simulator 220 is faster. This increases the differential pressure through constriction 24A, which in turn increases the hydraulic pressure in hydraulic line 13A on the backpressure chamber R2 side. On the other hand, the rate of pressure increase in wheel cylinders 8 by pump 7 relative to the rate of brake operation (pressure response) becomes insufficient. In third hydraulic line 13, this may make the hydraulic pressure in hydraulic line 13B on the first hydraulic line 11 side (wheel cylinder 8 side) significantly lower than that in hydraulic line 13A on the backpressure chamber R2 side. In such a case, check valve 23 opens. In this state, as shown in FIG. 6, some of brake fluid flowing from backpressure chamber R2 into hydraulic line 13A flows through constriction 24A into fourth hydraulic line 14 and other flows through check valve 230 into hydraulic line 13B. The amount of brake fluid Q0 flowing from backpressure chamber R2 into hydraulic line 13A is divided into the amount of brake fluid flowing through check valve 230 into hydraulic line 13B and the amount of brake fluid Q2 flowing through constriction 24A of fourth hydraulic line 14 toward reservoir tank 4 (Q0=Q1+Q2). In other words, part of brake fluid leaving backpressure chamber R2 is used to pressurize wheel cylinders 8 for auxiliary pressure control. In this process, stroke simulator 22 functions to augment the development of hydraulic pressure in wheel cylinders 8 by pump 7 as well as producing reaction force to the driver's brake operation.

More specifically, the difference in hydraulic pressure across check valve 230 between the first hydraulic pressure line 11 (hydraulic line 13B) side of third hydraulic line 13 and the backpressure chamber R2 (hydraulic line 13A) side is lower than or equal to that across constriction 24A between the reservoir tank 4 side of fourth hydraulic chamber 14 and the backpressure chamber R2 side. However, when wheel cylinders 8 are hardly pressurized by pump 7 (e.g., when the hydraulic pressure in hydraulic line 13B is low and substantially equal to atmospheric pressure), the difference in hydraulic pressure hardly occurs. The amount constricted by constriction 24A is set larger than the amount constricted by check valve 230 when open. In other words, brake fluid flows more readily through check valve 230 than through constriction 24A. As such, given the same difference in hydraulic pressure for example, the amount of fluid Q2 through constriction 24 is exceeded by the amount of fluid Q1 through check valve 230. Particularly in an emergency brake operation, the flow rate of brake fluid leaving backpressure chamber R2 is higher than that in a non-emergency brake operation, and the higher flow rate results in a reduction in the amount of fluid Q2 through constriction 24A. In emergency braking, the amount of fluid Q0 is larger than that in non-emergency braking. As such, a certain amount of fluid Q1, namely the difference between the amount of fluid Q0 and the amount of fluid Q2, is sent through hydraulic line 13B into first hydraulic line 11 and is used to pressurize wheel cylinders 8.

As described above, check valve 230 opens when the rate of pressure increase (pressure response) in wheel cylinders 8 by pump 7 for a given speed of depression of the brake pedal is insufficiently and the hydraulic pressure in hydraulic line 13B on the wheel cylinder 8 side is lower than that in hydraulic line 13A on the backpressure chamber R2 side. This (relative) decrease in hydraulic pressure on the wheel cylinder 8 side becomes conspicuous when the pedal stroke S is small (when motor 7A just starts running). A small pedal stroke S means a small stroke of piston 220 of stroke simulator 22. Stroke simulator 22 is adapted to pressurize wheel cylinders 8, at least by transmitting brake fluid from backpressure chamber R to wheel cylinders 8 (while producing reaction force to the driver's brake operation) when the stroke of piston 220 is small. On the other hand, at least when the stroke of piston 220 is large, stroke simulator 22 produces reaction force to the driver's brake operation.

As described above, as in the first embodiment, a flow of brake fluid from backpressure chamber R2 induced by the driver's emergency brake operation is used to generate wheel cylinder hydraulic pressure. This makes it possible to improve the pressure response in wheel cylinders 8.

In emergency braking, check valve 230 opens automatically and allows brake fluid to flow from backpressure chamber R2 into wheel cylinders 8. This mechanical actuation of check valve 230 induced by a difference in hydraulic pressure switches on and off auxiliary pressure control. The use of check valve 230 improves response more effectively than when a solenoid valve is used that would cause a delay in response for auxiliary pressure control, and also prevents pedal feel deterioration. More specifically, if a solenoid valve were used instead of check valve 230, the amount of hydraulic pressure supplied toward wheel cylinders 8 (hydraulic line 13B) would drop when the solenoid valve is closed even while the hydraulic pressure on the wheel cylinder 8 (hydraulic line 13B) side is lower than that on the backpressure chamber R2 (hydraulic line 13A); it might not be possible to improve response sufficiently. In contrast, provision is made in this embodiment to open check valve 230 when the hydraulic pressure on the wheel cylinder 8 (hydraulic line 13B) side is lower than that on the backpressure chamber R2 (hydraulic line 13A) side, so as to send brake fluid toward wheel cylinders 8 (hydraulic line 13B). In this manner, brake fluid is supplied to wheel cylinders 8 when needed, to ensure reliable auxiliary pressure control and improve responsive effectively.

If a solenoid valve were used instead of check valve 230, brake fluid would return from the wheel cylinder 8 (hydraulic line 13B) side to the backpressure chamber R2 (hydraulic line 13A) side when the solenoid valve is left open even through the hydraulic pressure on the wheel cylinder 8 (hydraulic line 13B) side exceeds that on the master cylinder 5 (hydraulic line 13A) side; this might result in a reduction in pressure response in wheel cylinders 8 and an increase in master cylinder hydraulic pressure. In contrast, provision is made in this embodiment to close check valve 230 when the hydraulic pressure on the wheel cylinder (hydraulic line 13B) side exceeds that on the backpressure chamber R2 (hydraulic line 13A) side, so as to prevent brake fluid from flowing back into backpressure chamber R2 (hydraulic line 13A). This in turn prevents a reduction in pressure response in wheel cylinders 8. Also, the master cylinder hydraulic pressure is prevented from rising under the influence of a high hydraulic pressure on the wheel cylinder 8 (hydraulic line 13B) side. This eliminates the possibility of giving the driver discomfort resulting from backward movement of the brake pedal 2, and resultant pedal feel deterioration.

Constriction 24A in fourth hydraulic line 14 may be replaced with a solenoid valve. In other words, SS/V IN 23 in third hydraulic line 13 of the first embodiment may be replaced with check value 230 as used in this embodiment. In this case, when the solenoid valve in fourth hydraulic line 14 is closed in an emergency, check valve 230 automatically opens. This eliminates the trouble of controlling SS/V IN 23 and still brings about the above-described effect. During auxiliary pressure control, brake fluid from backpressure chamber R2 can be prevented from leaking through the solenoid valve in fourth hydraulic line 14 toward reservoir tank 4, supplying brake fluid into the wheel cylinders more effectively. In this embodiment, the use of constriction 24A, rather than a solenoid valve, avoids the effect arising from a delay in response for control that would be caused by the solenoid valve in fourth hydraulic line 14. It is possible, for example, to prevent a delay in closing a solenoid valve in fourth hydraulic line 14 at the end of auxiliary pressure control would obstruct movement of piston 220 in stroke simulator 22 and deteriorate brake feel. It is also possible to prevent a reduction in brake fluid supplied to the wheel cylinder 8 (hydraulic line 13B) side that would result in a insufficient improvement in response if a delay in closing the solenoid valve in fourth hydraulic line 14 occurred at the beginning of auxiliary pressure control.

Constriction 24A is bypassed by bypass hydraulic line 140 with check valve 240. This makes smooth the flow of brake fluid from the reservoir tank 4 side through bypass hydraulic line 140 to the backpressure chamber R2 (hydraulic line 13A) side. Since this facilitates an increase in the volume of backpressure chamber R2, piston 220 moves smoothly in stroke simulator 22 toward positive pressure chamber R1 when brake pedal 2 moves back during brake-by-wire control. Thus, while stroke simulator 22 returns to its initial state of operation, brake pedal 2 moves back promptly.

In the event of a failure due to a leak of brake fluid from a brake line portion of inlet hydraulic line 15 connecting reservoir tank 4 and first unit 63 (e.g., the connection between this brake line and first unit 63), fluid reservoir 15A can be used as a source of brake fluid and a reservoir to which brake fluid is returned, so as to continue boost control (to raise or drop the wheel cylinder hydraulic pressure) with the aid of pump 7 and auxiliary pressure control. This leads to consistent brake performance and improvement in failsafe function. For this purpose, the volume of fluid reservoir 15A is set to a value which allows brake control to continue to some extent. Other details of the second embodiment are the same as those of the first embodiment and bring about the same effect as that of the first embodiment.

Embodiment 3

Figure 7:
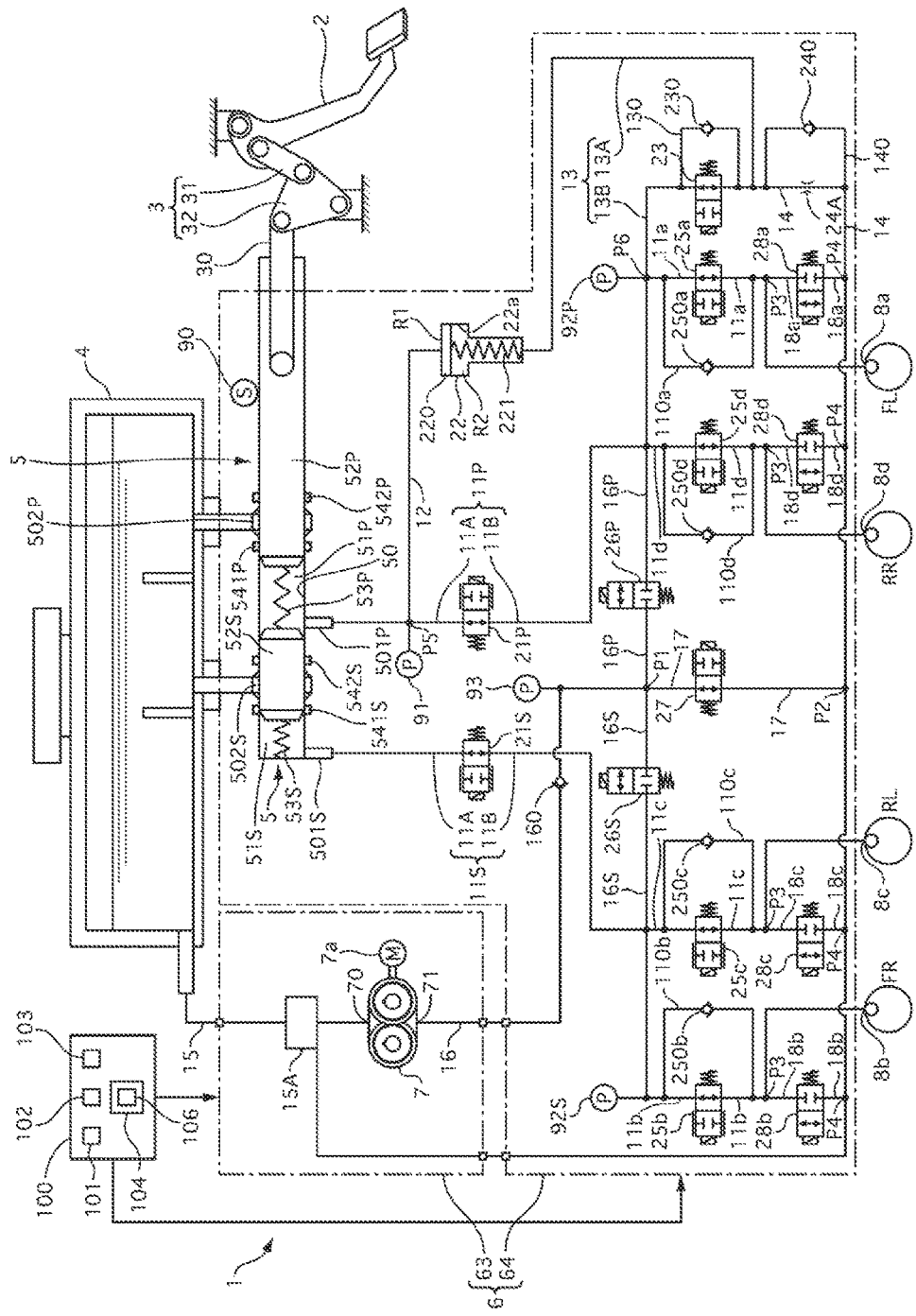
FIG. 7 is a schematic view of a brake control system of a third embodiment.

FIG. 7 is a schematic view of the structure of system 1 of the third embodiment. System 1 of this embodiment is different from that of the second embodiment, in that third hydraulic line 13 of the former is provided with stroke simulator IN valve SS/V IN 23, which is a normally open on/off solenoid valve. Third hydraulic line 13 is divided by SS/V IN 23 into hydraulic line 13A on the backpressure chamber R2 side and hydraulic line 13B on first hydraulic line 11 side. SS/V IN 23 is bypassed by bypass hydraulic line 130, running parallel to third hydraulic line 13. Bypass hydraulic line 130 connects hydraulic line 13A and hydraulic line 13B. Bypass hydraulic line 130 is provided with check valve 230, which admits only the flow of brake fluid flowing from the backpressure chamber R2 (hydraulic line 13A) side to the first hydraulic line 11 (hydraulic line 13B) side.

During boost control, wheel-cylinder hydraulic pressure controller 104 closes SS/V IN 23. When brake-by-side control is taking place during the driver's brake operation, wheel-cylinder hydraulic pressure controller 104 controls SS/V 23 in accordance with the state of antilock control to control the operation of stroke simulator 22. More specifically, to reduce the wheel cylinder hydraulic pressure under antilock control while hydraulic pressure generated in first hydraulic line 11 by pump 7 is used to control the hydraulic pressure in wheel cylinders 8, SS/V IN 23 is opened. To increase or hold the wheel cylinder hydraulic pressure, SS/V IN 23 is closed. Since other elements of this embodiment are the same as those of the second embodiment, description of the other elements is omitted by assigning the same reference numerals to them.

[Operation]

During boost control, wheel-cylinder hydraulic pressure controller 104 closes SS/V IN 23. In this way, third and fourth hydraulic lines 13 and 14 become structurally the same as those of the second embodiment and bring about the same effect. In non-emergency brake operation during boost control, the hydraulic pressure in hydraulic line 13B on the downstream side (first hydraulic line 11 side) of check valve 230 generated by pump 7 exceeds the hydraulic pressure in hydraulic line 13A on the upstream side (backpressure chamber R2 side) of check valve 230. This causes check valve 230 to close. Brake fluid leaving backpressure chamber R2 flows through fourth hydraulic line 14 toward reservoir tank 4. Thus stroke simulator 22 serves only to produce reaction force to the driver's brake operation. In emergency brake operation during boost control, the hydraulic pressure on the downstream side (hydraulic line 13B side) of check valve 230 generated by pump 7 may drop below the pressure of brake fluid leaving backpressure chamber R2 (the hydraulic pressure in hydraulic line 13A). In such a case, check valve 230 opens. At least part of hydraulic fluid coming from backpressure chamber R2 is delivered through third hydraulic line 13 toward wheel cylinder 8. Meanwhile, stroke simulator 23 serves not only to generate reaction force to the brake operation but also to perform the auxiliary pressurization function. When the hydraulic pressure on the downstream (hydraulic line 13B) side of check valve 230 generated by pump 7 exceeds the pressure of brake fluid coming from backpressure chamber R2 (the hydraulic pressure in hydraulic line 13A), check valve 230 closes, and the normal wheel cylinder pressure control by pump 7 resumes. In this manner, the auxiliary pressure control ends automatically. ECU 100 may be designed to open SS/V IN 23 while the driver's brake operation is recognized as a predetermined emergency one, that is, while the rate of pressurization in wheel cylinders 8 with the aid of pump 7 (pressure response) may become insufficient. In this case, wheel cylinders 8 are supplied, during the predetermined emergency brake operation, with brake fluid, not only through check valve 230 from backpressure chamber R2 but also through SS/V IN 23. In this way, wheel cylinders 8 are supplied with a greater amount of brake fluid to improve the rate of increase in pressure in wheel cylinders 8.

As in the first embodiment, brake pedal 2 can be actively controlled by controlling SS/V IN 23 in accordance with the state of antilock control during brake-by-wire control. More specifically, when reducing the wheel cylinder hydraulic pressure, SS/V IN 23 is opened so that the high pressure on the pump 7 side acts on piston 52P of master cylinder 5. Brake fluid from third hydraulic line 13 escaping through fourth hydraulic line 14 toward reservoir 4 is reduced by constriction 24A. This enables pedal reaction force to increase, imparting a stroke in the return direction of brake pedal 2. When SS/V IN 23 is closed during an increase in wheel cylinder hydraulic pressure, the high pressure on the pump 7 side is prevented from acting on piston 52P of master cylinder 5. Only a small amount of brake fluid in third hydraulic line 13A flows through constriction 24A and fourth hydraulic line 14 toward reservoir tank 4. This leads to a decrease in pedal reaction force, imparting a stroke in the direction of stepping on brake pedal 2. To close SS/V IN 23 while the wheel cylinder hydraulic pressure is held, SS/V 23 can be opened to such an extent that the amount of brake fluid released through constriction 24A toward reservoir tank 4 is substantially equal to that supplied through SS/V IN 23 toward backpressure chamber R2. This helps the driver recognize the ongoing antilock control. Other details of this embodiment are the same as those of the first and second embodiments and thus bring about the same effect.

Embodiment 4

Figure 8:
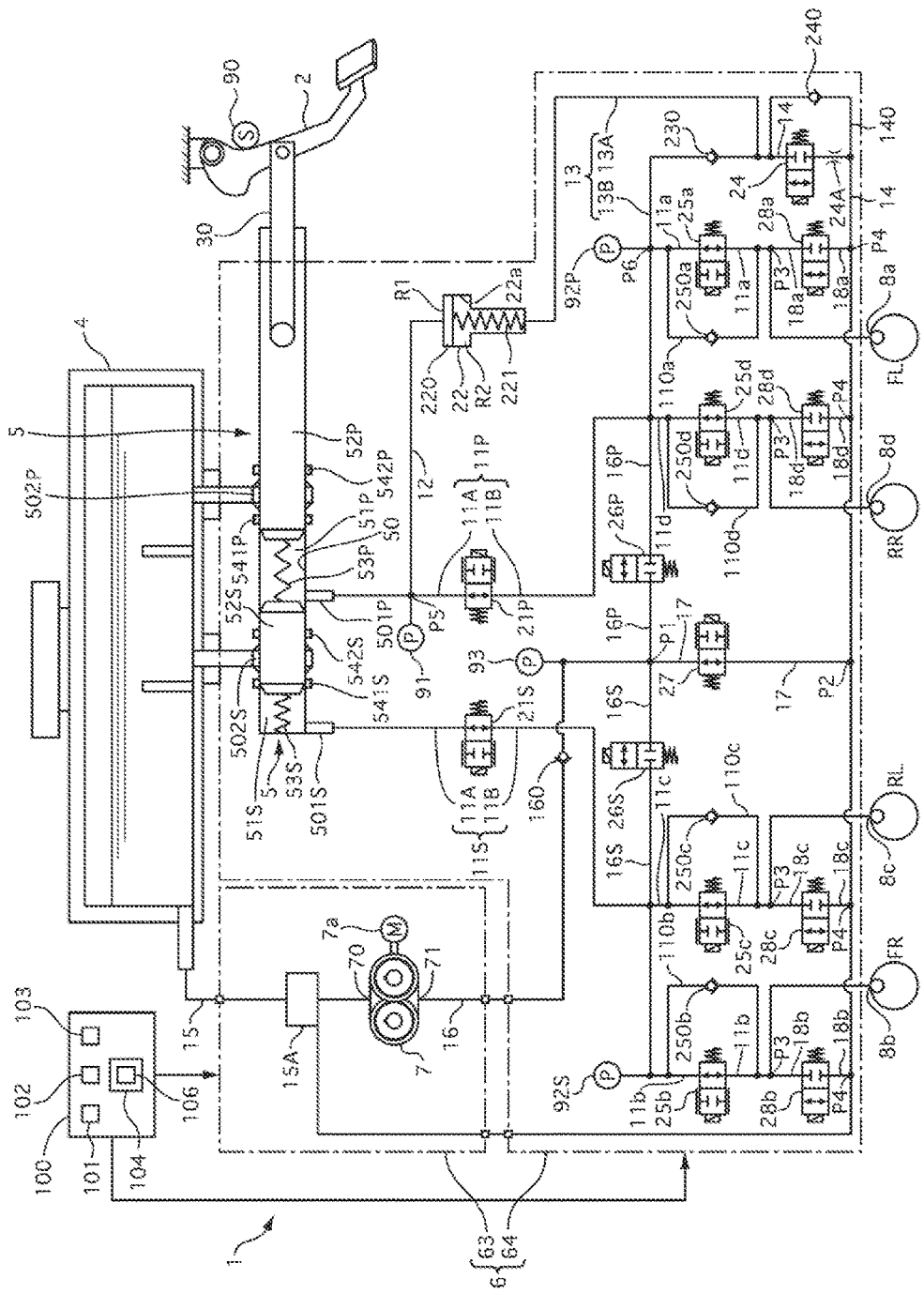
FIG. 8 is a schematic view of a brake control system of a fourth embodiment.

FIG. 8 is a schematic view of system 1 of the fourth embodiment. Unlike the second embodiment, brake pedal 2 and master cylinder 5 are not provided with booster 3 therebetween. An in the first embodiment, brake pedal 2 is directly connected to one end of pushrod 30. Stroke sensor 90 is fitted on brake pedal 2. Fourth hydraulic line 14 is provided with stroke simulator OUT valve SS/V OUT 24, which is a normally closed on/off solenoid valve. System 1 of this embodiment is different from that of the second embodiment, in that constriction 24A of this embodiment is in series with SS/V OUT 24. Constriction 24A is provided on the inlet hydraulic line 15 side of SS/V OUT 24. Bypass hydraulic line 140 bypasses SS/V OUT 24 and constriction 24A. During boost control, wheel-cylinder hydraulic pressure controller 104 opens SS/V OUT 24.

Figure 9:
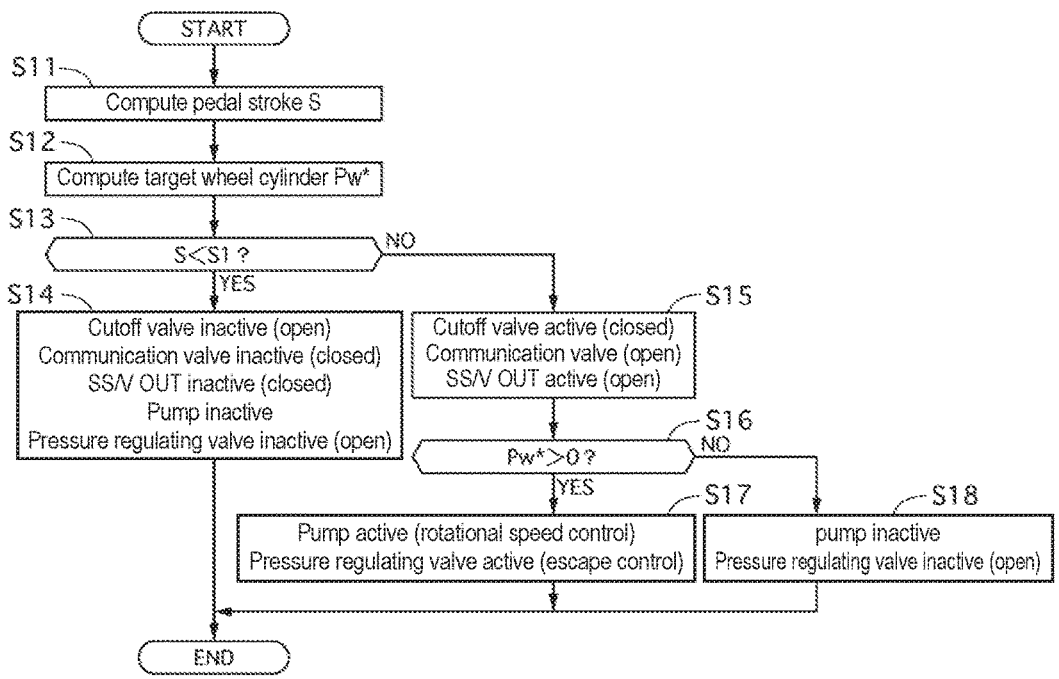
FIG. 9 is a flowchart of the essential part of wheel cylinder hydraulic pressure control of the fourth embodiment.

FIG. 9 is a flowchart of control by ECU 100. This process is repeated at a set frequency. In step S11, brake operating condition detector 101 detects pedal stroke S, and the process goes to step S12. In step S12, calculator 102 for calculating a target wheel cylinder hydraulic pressure calculates a target wheel cylinder hydraulic pressure. Next step S13 determines whether pedal stroke S is below set value S1. Set value S1 is set to a value greater than zero and less than set value S2. Set value S2 represents pedal stroke S (the upper limit of an idle stroke) over which the outer circumferential surface of piston 52 of master cylinder 5, which has not been in contact with first piston seal 541, comes into contact with it. When S exceeds S2, the flow of brake fluid from fluid chamber 51 toward inlet port 502 (reservoir tank 4) is limited to generate hydraulic pressure in fluid chamber 51 (master cylinder pressure). Target wheel cylinder pressure Pw* is such a value that the wheel cylinder pressure starts developing at the same time as the master cylinder pressure does, that is, Pw* becomes greater than zero when S exceeds S2. If S is determined to be lower than S1, the process goes to step S14. If S is determined to be greater than S1, the process goes to step S15. In step S14, to perform boost control, the following actuators are made inactive: cutoff valve 21 is made inactive (opened), communication valve 26 inactive (closed), SS/V OUT 24 inactive (closed), pump 7 inactive, and pressure regulating valve 27 inactive (opened). Subsequently, this control cycle is terminated.

In step S15, boost control is prepared by activating some of the actuators for performing the boost control. More specifically, wheel-cylinder hydraulic pressure controller 104 activates (closes) cutoff valve 21, activates (opens) communication valve 26, and activates (opens) SS/V OUT 24. In next step S16, wheel-cylinder hydraulic pressure controller 104 determines whether target wheel cylinder hydraulic pressure Pw* is greater than zero. If yes, the process goes to step S17. If it is zero, the process goes to step S18. In step S17, some other actuators for performing boost control are activated for boost control. More specifically, wheel-cylinder hydraulic pressure controller 104 activates pump 7 and activates (closes) pressure regulating valve 27 to perform escape control. Then this control cycle ends. In step 18S, some other actuators for performing boost control are deactivated to keep the state in which boost control is prepared to start. More specifically, wheel-cylinder hydraulic pressure controller 104 deactivates pump 7 and pressure regulating valve 27 (opened), and this control cycle ends. Since other elements of this embodiment are the same as those of the second embodiment, their description is omitted by assigning the same reference numerals.

[Operation]

SS/V OUT 24 in fourth hydraulic line 14 brings about the same effect as that of the first embodiment. SS/V OUT 24 is bypassed by bypass hydraulic line 140 with check valve 240. This allows brake fluid to flow smoothly from the reservoir tank 4 side through bypass line 140 to the backpressure chamber R2 (hydraulic line 13A) side, regardless of the state of operation of SS/V OUT 24. This in turn avoids the effect of a response delay in control of SS/V OUT 24 and allows brake pedal 2 to promptly move backward during brake-by-wire control (including boost control). In case of a failure in which SS/V OUT 24 remains closed while the brake pedal 2 is depressed (while stroke simulator 22 is in operation), brake fluid is sent back from the reservoir tank 4 side through bypass hydraulic line 140 into backpressure chamber R2. In this way, stroke simulator 22 can be brought back into its initial operation state even in that failure mode, and brake pedal 2 can be brought back to its initial position.

During boost control, wheel-cylinder hydraulic pressure controller 104 opens SS/V OUT 24. This puts third and fourth hydraulic lines 13 and 14 in the same configuration as that of the second embodiment, and the same effect can be obtained.

Figure 10:
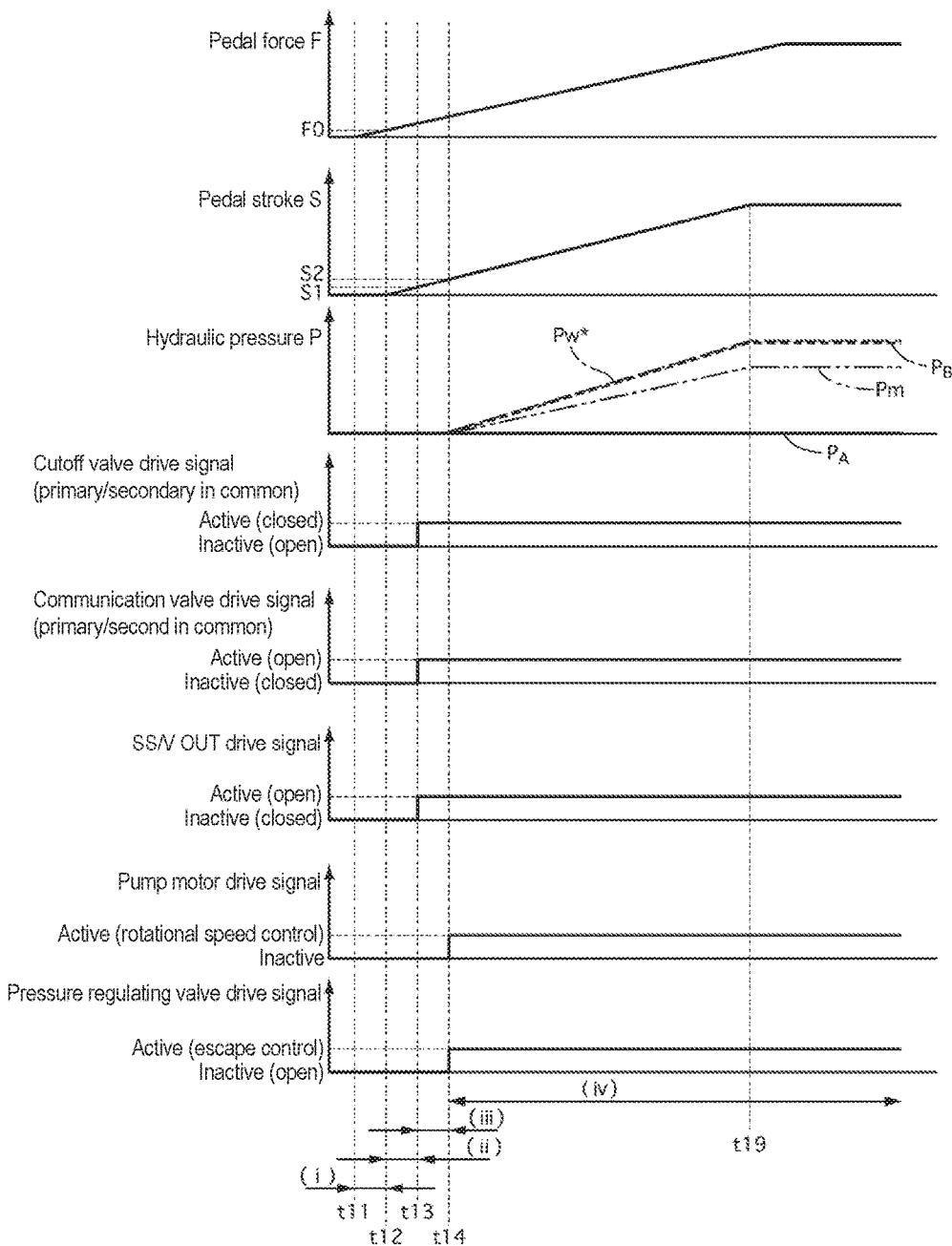
FIG. 10 is a time chart of the wheel cylinder hydraulic pressure control of the fourth embodiment (in a non-emergency operation).

FIG. 10 is a time chart of operation of system 1 when the driver performs normal brake pedal operation. At t11, the driver starts brake pedal operation. At t11 onward, pedal force F rises from zero. At t12, pedal stroke S becomes greater than zero, and brake operating condition detector 101 recognizes the driver's brake operation. Up to t19, pedal stroke S continues to increase approximately in correspondence to increasing pedal force F. From t19, pedal stroke S is held. In interval (i) from t11 to t12, pedal force F increases from zero to predetermined value F0. Predetermined value F0 is the lower limit of pedal force F (the upper limit of idle pedal force) at which pedal force F actually starts to contribute to (increase) pedal stroke S. In other words, interval (i) is an idle pedal force interval. From t12, when F exceeds F0, the idle pedal force interval ends, and pedal stroke S increases with increasing pedal force F. At t14, S reaches S2. When S is less than S2, the flow of brake fluid from hydraulic chamber 51 into inlet port 502 (reservoir tank 4) is not restricted, and hydraulic pressure (master cylinder pressure) is not generated in hydraulic chamber 51. In other words, intervals (i) and (ii) from t12 to t14 are idle stroke intervals. From time t11 to t13, S is less than S1. In the flowchart of FIG. 9, step S13 is followed by S14 to deactivate the actuators for performing boost control.

After t13, S exceeds S1. Then step S13 is followed by S15 to activate some of the above-described actuators to prepare for the start of boost control. Up to t14, the target wheel cylinder pressure Pw* is zero. Then step S16 is followed by S18 so that the boost controls remains ready to start. Interval (ii) from t13 to t14 is a boost control preparation interval. From t14, Pw* becomes greater than zero and continues to increase until t19. Then S16 is followed by S17 to perform boost control. Interval (iii) from t14 is a boost control interval. Since it is not an emergency brake operation, hydraulic pressure $P_B$ in hydraulic line 13B on the downstream (first hydraulic line 11) side of check valve 230 generated by pump 7 is controlled to Pw*. Check valve 230 is closed. Brake fluid flowing from backpressure chamber R2 into hydraulic line 13A flows through SS/V OUT 24, which is open, and constriction 24A and then fourth hydraulic line 14 toward reservoir tank 4. Hydraulic pressure $P_A$ in hydraulic line 13A becomes as low as that in fourth hydraulic line 14 (reservoir tank 4). Boost control preparation interval (ii) makes it possible to complete operation of cutoff valve 21, etc., at the start of boost control with pump 7, whether or not there is a response delay in control of cutoff valve 21 etc. This results in an improvement in pressure response in wheel cylinders 8 and pedal feel during boost control.

Figure 11:
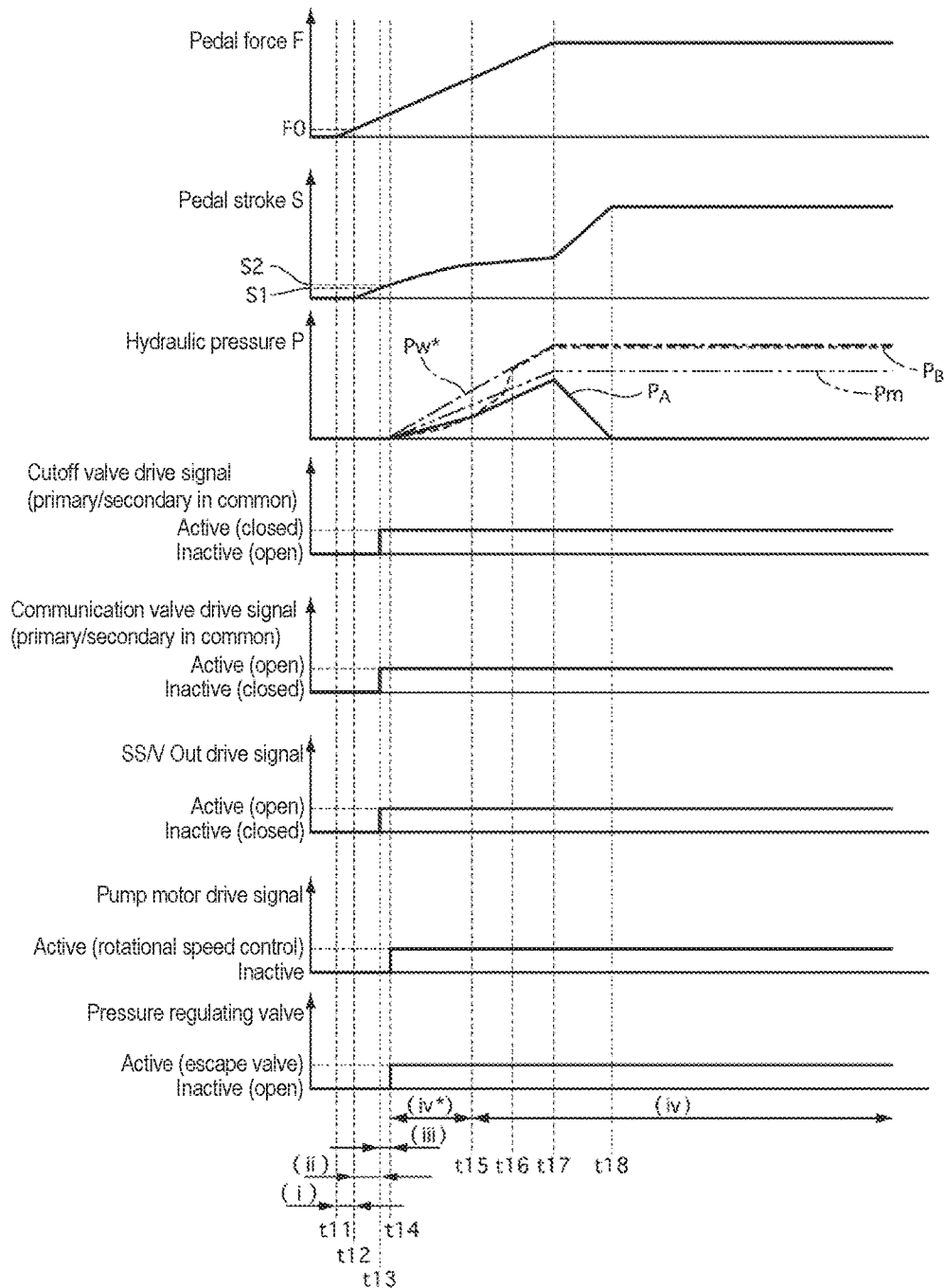
FIG. 11 is a time chart of the wheel cylinder hydraulic pressure control of the fourth embodiment (in an emergency operation).

FIG. 11 is a time chart of operation of system 1 when the driver performs rapid brake pedal operation. This operation is different from that of FIG. 10 in the following manner. From t11 to t17, pedal force F and pedal stroke S increase. From t14, boost control starts. Immediately after the start of boost control in an emergency brake operation, the pressure in wheel cylinders 8 cannot be increased by pump 7 as fast as a rapid increase in Pw* corresponding to an increase in pedal stroke S. As a result, hydraulic pressure $P_B$ in hydraulic line 13B generated by pump 7 is lower than Pw*. In the emergency, the rate of brake fluid flowing from backpressure chamber R2 into hydraulic line 13A is high, and the pressure differential across constriction 24A rises. As such, the hydraulic pressure (hydraulic pressure $P_A$ in hydraulic line 13A) on the upstream side of constriction 24A (on the backpressure chamber R2 side) increases in accordance with increasing pedal stroke S. From t14 to t15, $P_B$ is lower than or equal to $P_A$, such that check valve 230 is opened to allow brake fluid to flow from backpressure chamber R2 through third hydraulic line 13 (check valve 230) toward wheel cylinders 8. Interval (iv*) from t14 to t14 is an auxiliary pressure control. At t15, $P_B$ exceeds $P_A$. Thus check valve 230 closes and the auxiliary pressure control ends. At t16, $P_E$ rises up to Pw*. From t16, $P_B$ is controlled to Pw*. From t17, pedal force F is held and thus Pm is also held. As such, the rate of brake fluid flowing from backpressure chamber R2 into hydraulic line 13 drops. Brake fluid present on the backpressure chamber R2 side of constriction 24A is released toward reservoir tank 4 through open SS/V Out 24 and constriction 24A. The hydraulic pressure on the backpressure chamber R2 side of constriction 24A (hydraulic pressure $P_A$ in hydraulic line 13A) thus drops toward reservoir tank 4 on the lower pressure side. Pm exerted on piston 220 by positive pressure chamber R1 remains the same, while $P_A$ exerted on piston 220 by backpressure chamber R2 drops, such that piston 220 moves toward backpressure chamber R2, increasing the volume of positive pressure chamber R1. Piston 52P thus moves to reduce the volume of hydraulic chamber 51P of master cylinder 5, increasing pedal stroke S. At t18, $P_A$ drops to the pressure on the reservoir tank 4 side, and pedal stroke S stops increasing.

At the start of the brake system or the vehicle system (e.g., when the ignition switch is turned on or the door key lock is released), SS/V OUT 24 may be opened and kept in that state. In auxiliary pressure control (emergency brake operation), SS/V OUT 24 may be closed. This prevents brake fluid leaving backpressure chamber R2 from leaking through SS/V OUT 24 toward reservoir tank 4 and enables an efficient supply of brake fluid into wheel cylinders 8. In this case, movement of piston 220 in stroke simulator 22 after the end of auxiliary pressure control, which would deteriorate pedal feel, can be prevented, for example by opening SS/V OUT 24 before closing check valve 230. In this embodiment, SS/V OUT 24 is opened in the auxiliary pressure control (emergency braking) as well as in normal wheel cylinder pressure control (non-emergency braking). This eliminates the need for opening or closing SS/V OUT 24 at the start or end of auxiliary pressure control, improving the noise/judder characteristics of system 1. Constriction 24 in fourth hydraulic line 14 may be provided on the third hydraulic line 13 side of SS/V OUT 24, rather than on the inlet hydraulic line 15 side. The other details of this embodiment are the same as those of the first and second embodiments and bring about the same effect as those of the first and second embodiments.

Embodiment 5

Figure 12:
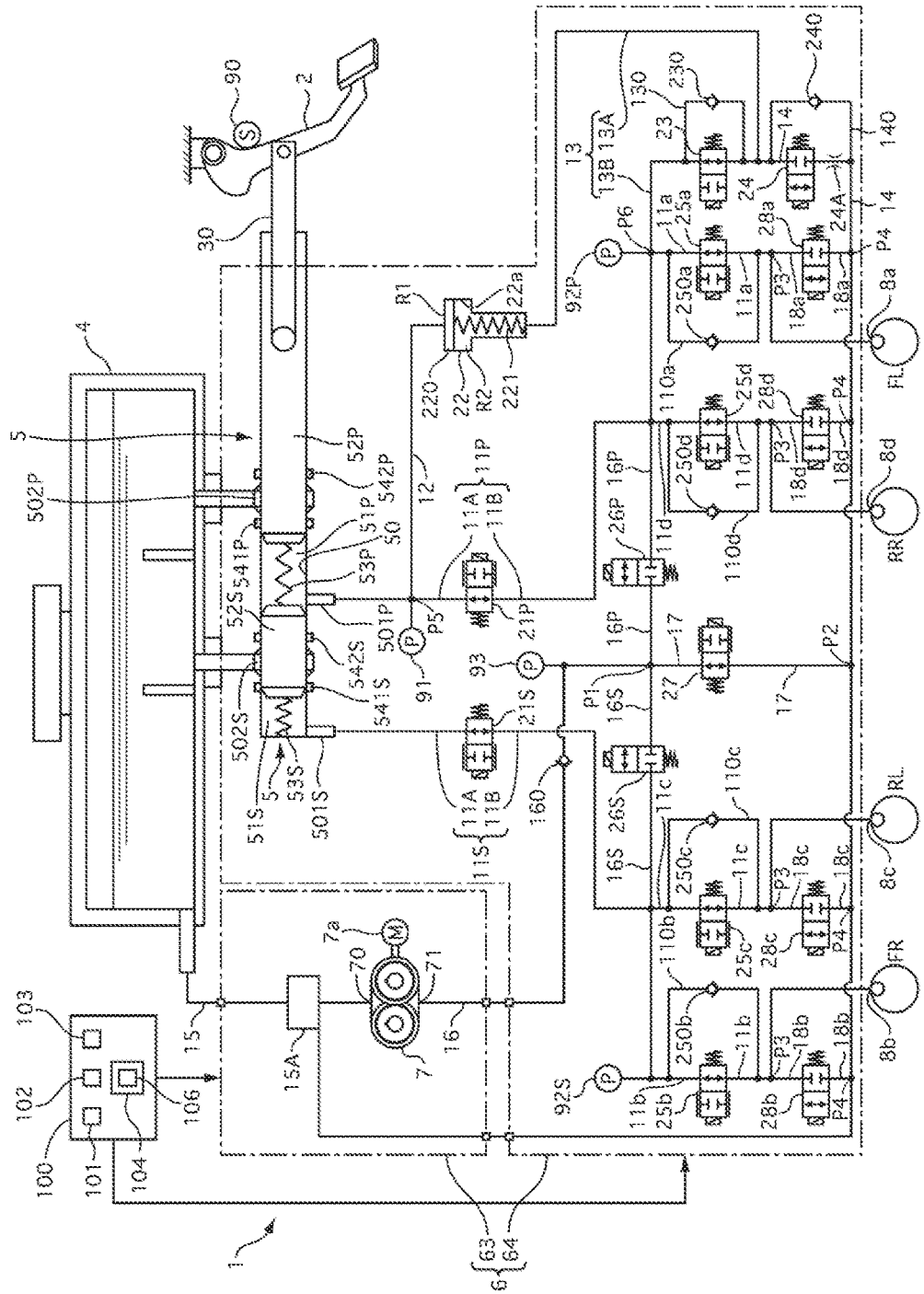
FIG. 12 is a schematic view of a brake control system of a fifth embodiment.

FIG. 12 is a schematic view of system 1 of the fifth embodiment. As in the third embodiment, third hydraulic line 13 is provided with SS/V IN 23, bypass line 130, and check valve 230. Fourth hydraulic line 14 is provided with stroke simulator OUT valve SS/V OUT 24, which is a normally closed on/off solenoid valve, and constriction 24 in series, as in the fourth embodiment. This embodiment combines the third and fourth embodiments. As in the third and fourth embodiments, wheel-cylinder hydraulic pressure controller 104 controls SS/V IN 23 and SS/V OUT 24. During boost control, SS/V IN 23 is closed and SS/V OUT 24 opened. The other elements are the same as those of the fourth embodiment, and their description is omitted by assigning the same reference numerals.

[Operation]

This embodiment, structurally similar to the third and fourth embodiments, brings about a similar effect to that of the third and fourth embodiment. For example, during boost control, SS/V IN 23 is closed and SS/V OUT 24 opened. This puts third and fourth hydraulic lines 13 and 14 in the same configuration as that of the second embodiment and brings about the same effect as that of the second embodiment.

Embodiment 6

Figure 13:
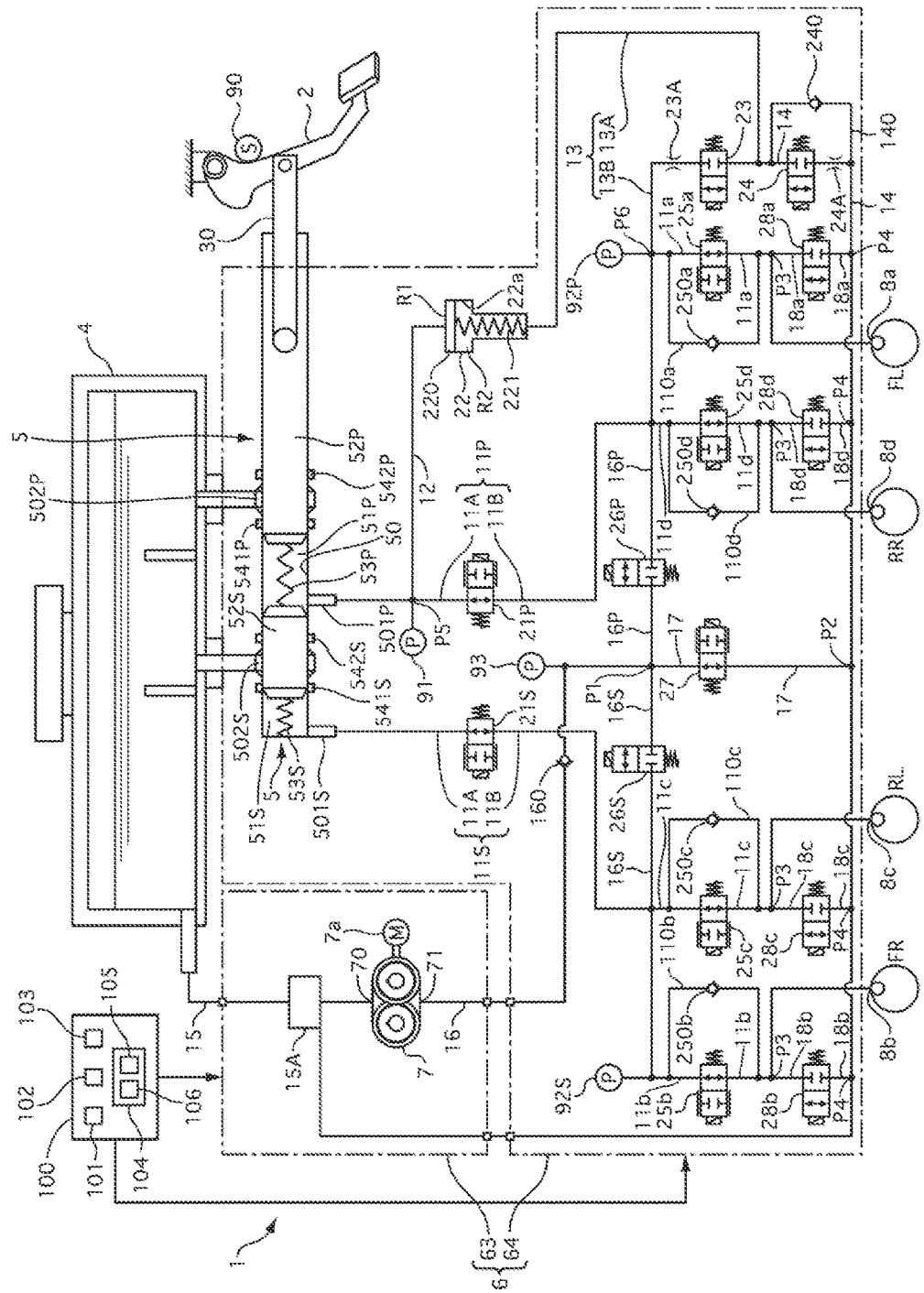
FIG. 13 is a schematic view of a brake control system of a sixth embodiment.

FIG. 13 is a schematic view of system 1 of the sixth embodiment. As in the first embodiment, third hydraulic line 13 is provided with a stroke simulator IN valve SS/V IN 23, which is a normally closed on/off solenoid valve. System 1 of this embodiment is different from that of the first embodiment, in that SS/V IN 23 of the former is in series with constriction 23A. Third hydraulic line 13 is divided by SS/V IN 23 into hydraulic line 13A on the backpressure chamber R2 side and hydraulic line 13B on the first hydraulic line 11 side. Constriction 23A is provided on the first hydraulic line 11 (hydraulic line 13B) side of SS/V IN 23. As in the fourth embodiment, fourth hydraulic line 14 is providing with SS/V OUT 24, constriction 24A, and bypass line 140 (check valve 240). The amount constricted by constriction 24A is larger than that by constriction 23A.

As in the fourth embodiment, wheel-cylinder hydraulic pressure controller 104 opens SS/V OUT 24 during boost control. Wheel-cylinder hydraulic pressure controller 104 has auxiliary pressure controller 105. Auxiliary pressure controller 105 performs auxiliary pressure control in accordance with the driver's brake operation during boost control. More specifically, auxiliary pressure controller 105 determines whether the driver's brake operation is for a predetermined emergency. If so (the speed of depression of brake pedal 2 is high), auxiliary pressure controller 105 opens SS/V IN 23. If not (the speed of depression of brake pedal 2 is not high), auxiliary pressure controller 105 closes SS/V IN 23.

Figure 14:
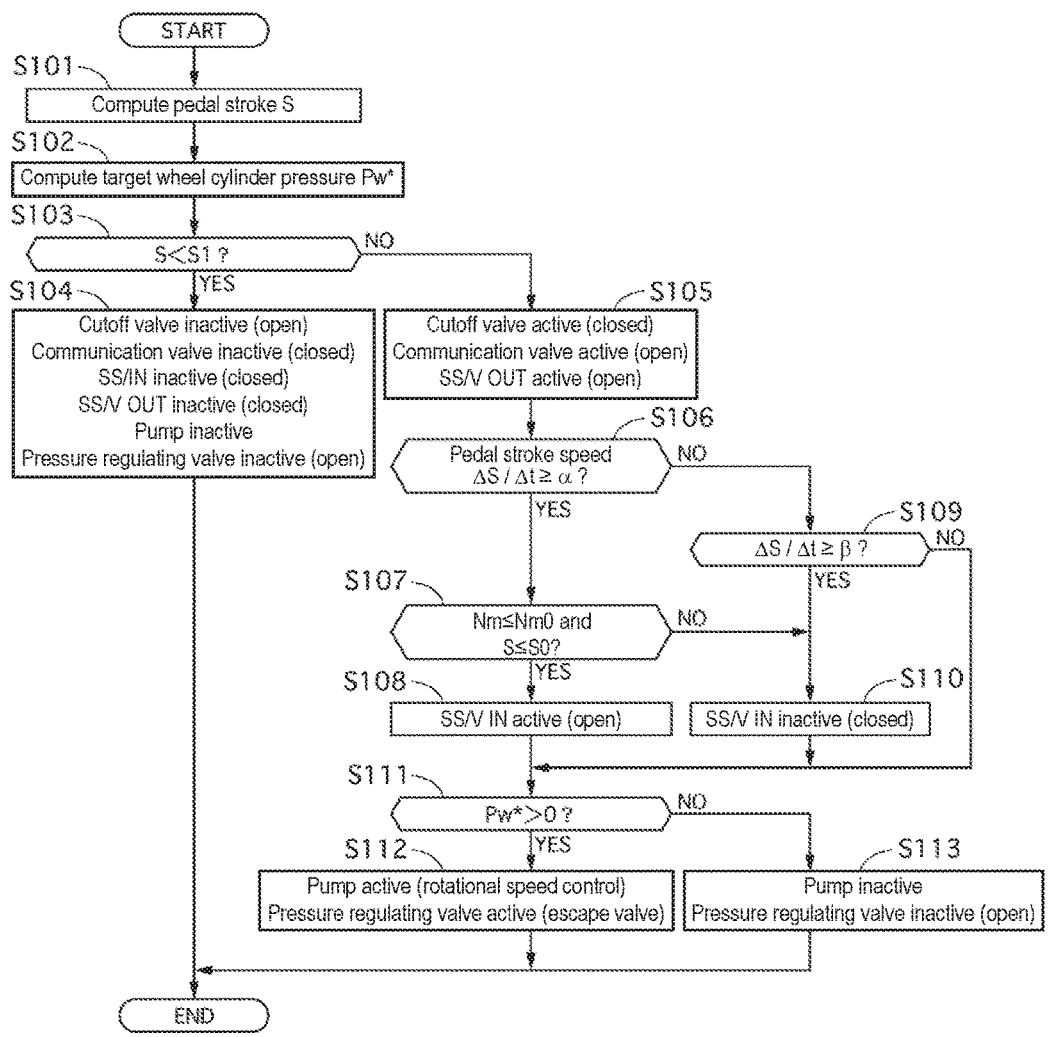
FIG. 14 is a flowchart of the essential part of wheel cylinder hydraulic pressure control of the sixth embodiment.

FIG. 14 is a flowchart of control of ECU 100. This process is repeated at a set frequency. Steps S101 to S103 and S105 are the same as steps S11 to S13 and S15 of the fourth embodiment (FIG. 9). In step S104, the actuators for performing boost control are deactivated. Specifically, SS/V IN 23 is deactivated (closed). Other actuators are controlled as in step S14. In step S106, auxiliary pressure controller 105 determines whether pedal stroke speed $\Delta S/\Delta t$ is greater than or equal to first set value $\alpha$. $\alpha$ is a $\Delta S/\Delta t$ threshold for permitting operation of SS/V IN 23 (performing auxiliary pressure control). If $\Delta S/\Delta t$ is greater than or equal to $\alpha$, the process goes to step S107. If not, the process goes to step S109. In step S107, as in step S2 of the first embodiment (FIG. 2), auxiliary pressure controller 105 determines whether motor rotational speed Nm is less than or equal to set valve Nm0 and pedal stroke S is less than or equal to set valve S0. If yes, the process goes to step S108. If Nm is greater than Nm0 or S is greater than S0, the process goes to step S110. In step S108, auxiliary pressure controller 105 activates (opens) SS/V IN 23, and the process goes to S111. In step S109, auxiliary pressure controller 105 determines whether pedal stroke speed $\Delta S/\Delta t$ is less than or equal to second set valve $\beta$ ($<\alpha$). $\beta$ is a $\Delta S/\Delta t$ threshold for ending operation of SS/V IN 23 (auxiliary pressure control). If yes, the process goes to step S110. If no, the process goes to S111. In step S110, SS/V IN 23 is deactivated (closed), and the process goes to step S111. Steps S111 to S113 are the same as steps S16 to S18 of the fourth embodiment (FIG. 9). Since other elements of this embodiment are the same as those of the fourth embodiment, their description is omitted by assigning the same reference numerals.

[Operation]

Third hydraulic line 13 is provided with SS/V IN 23. SS/V IN 23 forms (part of) a switch for sending brake fluid coming from backpressure chamber R2 to either the flow path leading via fourth hydraulic line 14 to reservoir tank 4 or the flow path leading via third hydraulic line 13 to first hydraulic line 11P (11B). SS/V IN 23 may be a normally open one. Fourth hydraulic line 14 is provided with constriction 24A and SS/V OUT 24. Constriction 24A and SS/V OUT 24 form part of the switch, as in the second and fourth embodiments.

During boost control, wheel-cylinder hydraulic pressure controller 104 opens SS/V OUT 24. In non-emergency braking, auxiliary pressure controller 105 closes SS/V IN 23. This put third and fourth hydraulic lines 13 and 14 in the same configuration as that of the second embodiment (for non-emergency braking) and brings about the same effect. That is, auxiliary pressure control does not take place (ends) and normal wheel cylinder pressure control by pump 7 takes place. Since brake fluid does not return from the wheel cylinder 8 (hydraulic line 13B) to the backpressure chamber R2 (hydraulic line 13A) side, the master cylinder hydraulic pressure is prevented from rising under the influence of the high hydraulic pressure on the wheel cylinder 8 (hydraulic line 13B) side.

Figure 15:
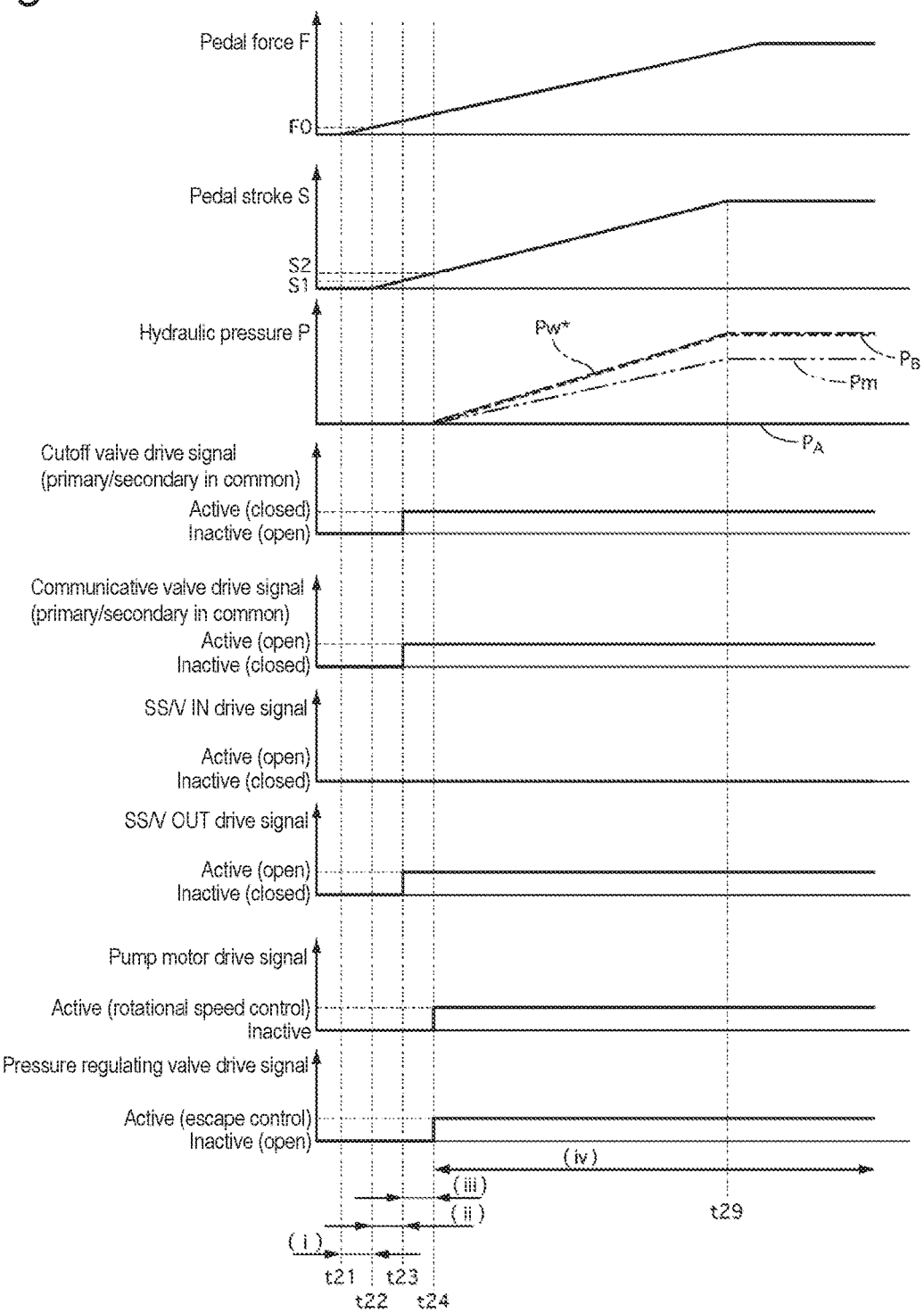
FIG. 15 is a time chart of the wheel cylinder hydraulic pressure control of the sixth embodiment (in a non-emergency operation).

FIG. 15 is a time chart of operation of system 1 when the driver performs normal brake operation. At t23, pedal stroke S exceeds S1. In the flowchart of FIG. 14, step S103 is followed by S105 to activate some of the actuators for performing boost control and prepare for boost control. From t22 when S becomes greater than zero, the rate of pedal depression is low (pedal stroke speed $\Delta S/\Delta t$ is lower than a). Thus step S106 is followed by S109 to deactivate (close) SS/V IN 23. The remainder of operation is the same as that of the fourth embodiment (FIG. 10).

In emergency braking, auxiliary pressure controller 105 opens SS/V IN 23. This puts third and fourth hydraulic lines 13 and 14 in the same configuration as that of the second embodiment (for emergency braking) and thus brings about the same effect. Specifically, in emergency braking, the hydraulic pressure in hydraulic line 13B on the first hydraulic line 11 side of third hydraulic line 13 drops significantly lower than that in hydraulic line 13A on the backpressure chamber R2 side. This create a pressure differential across constriction 23A. Brake fluid flowing from backpressure chamber R2 into hydraulic line 13A flows through constriction 23A into hydraulic line 13B and into first hydraulic line 11P (11B) and is used to increase the pressure in wheel cylinders 8. In this way, auxiliary pressure control is performed. The amount constricted by constriction 24A is set larger than that by constriction 23A, making it easier for brake fluid to flow through constriction 23A than constriction 24A. As a result, brake fluid coming from backpressure chamber R2 is preferentially sent toward wheel cylinders 8. In other words, the path of brake fluid flowing from backpressure chamber R2 in response to the driver's brake operation (pedal effort) is switched to the path leading through third hydraulic line 13 to first hydraulic line 11P (11B). When auxiliary pressure controller 105 determines that emergency braking has ended or auxiliary pressure control is no longer necessary, it closes SS/V IN 23. This switches the path of brake fluid from backpressure chamber R2 to the path leading via fourth hydraulic line 14 to reservoir tank 4. Even while SS/V IN 23 is open, brake fluid is prevented from transmitted through hydraulic line 13B toward wheel cylinders 8 when the hydraulic pressure on the upstream (backpressure chamber R2 side) of constriction 23A drops below that on the downstream side (first hydraulic line side).

Figure 16:
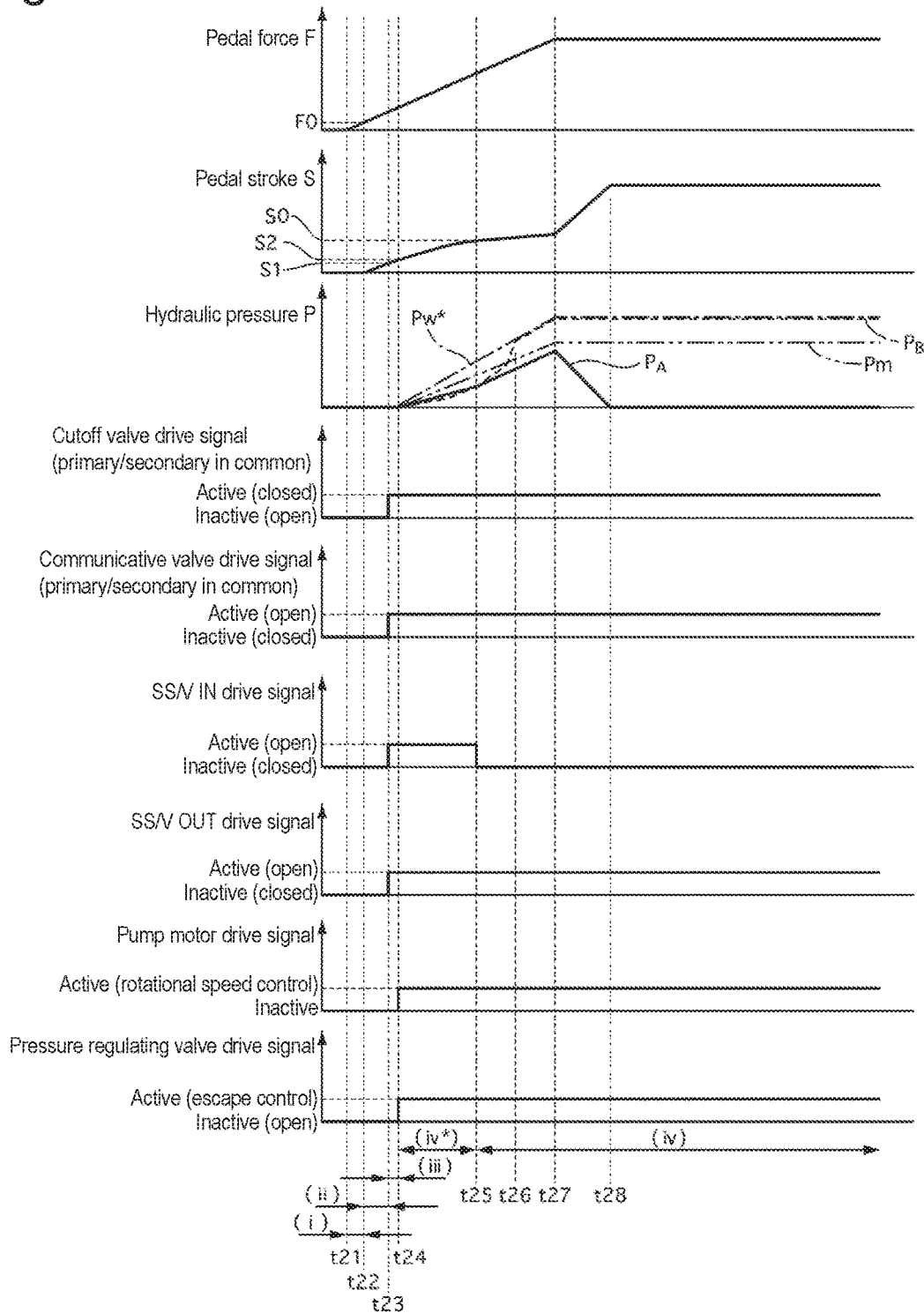
FIG. 16 is a time chart of the wheel cylinder hydraulic pressure control of the sixth embodiment (in an emergency operation).

FIG. 16 is a time chart of operation of system 1 when the driver performs rapid brake pedal operation. At t23, as in FIG. 15, boost control is prepared. At t23, the rate of pedal depression is high ($\Delta S/\Delta t$ is greater than or equal to a) Pedal stroke S is less than or equal to S0, and motor rotational speed Nm is less than or equal to Nm0. As such, the process goes from step S106 to step S107 and then to S108 to activate (open) SS/V IN 23. From t24 onward, other actuators for performing boost control are activated to perform boost control. From t24 to t25 when $P_B$ is lower than or equal to $P_A$, brake fluid from backpressure chamber R2 to hydraulic line 13A is supplied through constriction 23A and hydraulic line 13B toward wheel cylinders 8. In this way, hydraulic pressure control is performed. At t25, $\Delta S/\Delta t$ drops below 1 or S exceeds S0 or Nm exceeds Nm0. The process then goes from step S105 to S110 to deactivate (close) SS/V IN 23. This puts the auxiliary pressure control to an end and starts normal wheel cylinder pressure control. Since $\alpha$ is set different from $\beta$, control hunting can be prevented. The remainder of operation is the same as that of the fourth embodiment (FIG. 11).

Third hydraulic line 13 may dispense with constriction 23A. Since this embodiment uses constriction 23A, it is possible to prevent brake fluid from flowing back from the wheel cylinder 8 (hydraulic line 13B) side toward backpressure chamber R2 (hydraulic line 13A) even when SS/V IN 23 is closed after the hydraulic pressure on the upstream side of constriction 23A (on the backpressure chamber R2 side) drops below that on the downstream side (on the first hydraulic line side 11a). As the pressure differential across constriction 23A increases, the amount of brake fluid passing constriction 23A decreases. As a result, even when the hydraulic pressure on the downstream side of constriction 23A is raised above that on the upstream side by operation of pump 7, brake fluid is prevented to some extent from flowing back from the downstream side (wheel cylinder 8 side) to the upstream side (backpressure chamber R2 side). SS/V IN 23 may be omitted. In this embodiment, the use of SS/V IN 23, which shuts communication through hydraulic line 13B, ensures more reliably to prevent reverse flow of brake fluid to the backpressure chamber R2 side. This in turn prevents pedal feel deterioration more effectively. At the startup of the brake system or vehicle system, SS/V IN 23 may be opened and kept in that state (and SS/V IN 23 is closed for non-emergency braking during brake-by-wire control). Constriction 23 in third hydraulic line 13 may be provided on the backpressure chamber R2 side of SS/V IN 23, instead of on the first hydraulic line 11 side. Other details are the same as those of the first and fourth embodiments and bring about the same effect.

Other Embodiments

The present invention is not limited to the embodiments described above, and various design modifications may be made without departing from the spirit and scope of the invention. For example, the brake control system (brake system) of the present invention is not limited to those of the embodiment and may be any other brake control system as long as it comprises a mechanism (stroke simulator) for approximating reaction force to pedal operation and uses a hydraulic pressure source, other than the master cylinder, to apply pressure to the wheel cylinders. In the embodiments, a hydraulic wheel cylinder is fitted to each wheel. Instead, for example, hydraulic cylinders may be used only at the front wheels, and the rear wheels may be provided with calipers that provide braking force with the aid of an electric motor. The operation of the actuators for controlling wheel cylinder hydraulic pressure, for example, the method for setting motor rotational speed (command value), is not limited to that of the embodiments and may be modified as required. The embodiments may be combined as required.

The invention claimed is:
1. A brake control system comprising:
  a hydraulic pressure source configured to use brake fluid supplied from a reservoir to generate hydraulic pressure in a first hydraulic line and apply it to a wheel cylinder;
  a stroke simulator comprising a piston that divides a cylinder into at least two chambers, the piston being configured to move axially in the cylinder under the action of brake fluid supplied from a master cylinder, thereby producing reaction force to a driver's brake operation;
  a second hydraulic line provided between one of the two chambers of the stroke simulator and the master cylinder; and
  a third hydraulic line provided between the other chamber of the stroke simulator and the first hydraulic line to transmit brake fluid from the other chamber into the first hydraulic line, wherein
    the third hydraulic line is connected to a portion of the first hydraulic line, which portion is in communication with a discharge side of the hydraulic pressure source, in such a manner that brake fluid is transmitted from the other chamber to the wheel cylinder.
2. A brake control system according to claim 1, wherein the hydraulic pressure source is a pump.
3. A brake control system according to claim 2, further comprising a fourth hydraulic line branching off from the third hydraulic line and located between the other chamber of the stroke simulator and the reservoir.

4. A brake control system according to claim 3, further comprising a switch for switching brake fluid flowing from the other chamber between a flow path leading through the third hydraulic line to the first hydraulic line and a flow path leading through the fourth hydraulic line to the reservoir.

5. A brake control system according to claim 4, wherein the switch is provided in the third hydraulic line and comprises: a one-way valve that admits only a flow from the other chamber to the first hydraulic line; and a constriction provided in the fourth hydraulic line and having a set flow resistance.

6. A brake control system according to claim 5, wherein when hydraulic pressure on a downstream side of the one-way valve generated by the pump exceeds hydraulic pressure of brake fluid flowing from the other chamber, the one-way valve is closed to allow brake fluid flowing from the other chamber to flow through the fourth hydraulic line and the constriction into the reservoir.

7. A brake control system according to claim 4, wherein the switch comprises a stroke simulator IN valve in the third hydraulic line.

8. A brake control system according to claim 7, wherein: the switch comprises a one-way valve disposed in parallel relation to the stroke simulator IN valve to admit only a flow from the other chamber to the first hydraulic line; and
when the stroke simulator IN valve is closed and hydraulic pressure on a downstream side of the one-way valve generated by the pump exceeds hydraulic pressure of brake fluid flowing from the other chamber, the one-way valve is closed to allow brake fluid flowing from the other chamber to flow through the fourth hydraulic line into the reservoir.

9. A brake control system according to claim 4, wherein the switch comprises a stroke simulator OUT valve in the fourth hydraulic line.

10. A brake control system according to claim 9, wherein the switch comprises a constriction in series with the stroke simulator OUT valve, and the stroke simulator OUT valve opens when the pump generates hydraulic pressure in the wheel cylinder.

11. A brake control system according to claim 10, wherein:
the pump is driven by an electric motor;
the brake control system further comprises a rotational speed measuring unit for measuring or estimating the rotational speed of the electric motor;
when the rotational speed of the electric motor measured or estimated is lower than or equal to a set value, the auxiliary pressure control can be performed and when the rotational speed of the electric motor measured or estimated is higher than the set value, the auxiliary pressure control is not performed.

12. A brake control system according to claim 10, wherein:
the brake control system further comprises a brake operation amount measuring unit for measuring or estimating an amount of brake operation by the driver;
in the auxiliary pressure control, an amount of brake fluid, corresponding to the amount of brake operation, flowing from the other chamber, is transmitted to the first hydraulic line to apply pressure to the wheel cylinder;
when the driver's brake operation is a predetermined emergency brake operation and the amount of brake operation measured or estimated is less than or equal to a set value, the auxiliary pressure control can be performed, and when the amount of brake operation measured or estimated is greater than the set value, the auxiliary pressure control is not performed.

13. A brake control system according to claim 10, wherein:
the brake control system comprises a wheel cylinder hydraulic pressure measuring unit for measuring or estimating hydraulic pressure in the wheel cylinder;
when the wheel cylinder hydraulic pressure measured or estimated is lower than or equal to a set value, the auxiliary pressure control can be performed, and when the wheel cylinder hydraulic pressure measured or estimated is higher than the set value, the auxiliary pressure control is not performed.

14. A brake control system according to claim 4, wherein:
the switch comprises: a stroke simulator IN valve in the third hydraulic line;
and a stroke simulator OUT valve in the fourth hydraulic line;
when the stroke simulator IN valve is opened and the stroke simulator OUT valve is closed, the brake fluid flowing from the other chamber is transmitted to the first hydraulic line to perform auxiliary pressure control to assist in generating hydraulic pressure in the wheel cylinder with the aid of the pump.

15. A brake control system comprising:
a first hydraulic line provided between a master cylinder for generating hydraulic pressure in response to a driver's brake operation and a wheel cylinder at a wheel;
a pump capable of generating hydraulic pressure in the wheel cylinder by pumping brake fluid from a reservoir into the first hydraulic line;
a cutoff valve provided in the first hydraulic line between the pump and the master cylinder;
a stroke simulator comprising a piston capable of axially moving in a cylinder under the action of brake fluid supplied from the master cylinder and dividing the cylinder into at least two chambers in a liquid tight manner, wherein an amount of brake fluid, corresponding to an amount of brake operation, flows from the master cylinder into one of the two chambers to move the piston and increase the volume of said one chamber, thereby generating reaction force to the driver's brake operation and permitting an amount of brake fluid, corresponding to the amount of brake operation, to flow out of the other of the two chambers;
a second hydraulic line provided between one of the two chambers of the stroke simulator and the master cylinder;
a third hydraulic line provided between a portion in the first hydraulic line between the cutoff valve and the wheel cylinder, and the other chamber of the stroke simulator; and
a control unit for controlling the pump and the cutoff valve, wherein:
the portion in the first hydraulic line is in communication with a discharge side of the pump, in such a manner that brake fluid is transmitted from the other chamber to the wheel cylinder;
the control unit comprises an auxiliary pressure controller that, when generating hydraulic pressure in the wheel cylinder by actuating the pump and closing the cutoff valve at the time of the driver's brake operation, transmits brake fluid from the other chamber of the stroke simulator into the first hydraulic line, in accordance with a condition of the driver's brake operation, to aid the pump in generating hydraulic pressure in the wheel cylinder; and the auxiliary pressure controller uses an amount of brake fluid, corresponding to the amount of brake operation, flowing from the other chamber of the stroke simulator through the third hydraulic line to apply pressure to the wheel cylinder.

16. A brake control system according to claim 15, further comprising an emergency detector for determining whether the state of the brake operation is a predetermined emergency operation state, wherein the auxiliary pressure controller applies pressure to the wheel cylinder when the emergency detector detects a predetermined emergency operation state.

17. A brake control system according to claim 15, further comprising:

a fourth hydraulic line branching off from the third hydraulic line and located between the other chamber of the stroke simulator and the reservoir; and a switch for switching brake fluid flowing from the other chamber between a flow path leading via the third hydraulic line to the first hydraulic line and a flow path leading via the fourth hydraulic line to the reservoir.

18. A brake control system according to claim 17, wherein: the switch comprises at least a one-way valve in the third hydraulic line to admit only a flow from the other chamber to the first hydraulic line; and when hydraulic pressure on the downstream side of the one-way valve generated by the pump exceeds hydraulic pressure of brake fluid flowing from the other chamber, the one-way valve is closed to allow brake fluid flowing from the other chamber to flow via the fourth hydraulic line to the reservoir.

19. A brake control system according to claim 17, wherein the switch comprises a resisting portion in the fourth hydraulic line.

20. A brake control system according to claim 17, wherein:

the switch comprises at least a control valve in the third hydraulic line; and the auxiliary pressure controller performs auxiliary pressure control by opening the control valve.

21. A brake system comprising:

a master cylinder for generating master cylinder hydraulic pressure in accordance with a driver's brake operation;

a wheel cylinder provided at a vehicle wheel to generate brake force at the wheel; and a hydraulic pressure controller provided between the master cylinder and the wheel cylinder to control hydraulic pressure in the wheel cylinder, wherein the hydraulic pressure controller comprises:

a first hydraulic line provided between the master cylinder and the wheel cylinder;

a pump capable of generating hydraulic pressure in the wheel cylinder by pumping brake fluid from a reservoir into the first hydraulic line;

a cutoff valve provided in the first hydraulic line between the pump and the master cylinder;

a stroke simulator comprising a piston that divides a cylinder into at least two chambers in a liquid tight manner, the piston being configured to move axially in the cylinder under the action of brake fluid supplied from the master cylinder, thereby producing reaction force to a driver's brake operation;

a second hydraulic line connecting one of the two chambers of the stroke simulator to a point between the cutoff valve in the first hydraulic line and the master cylinder; and a third hydraulic line provided between a portion in the first hydraulic line between the cutoff valve and the wheel cylinder, and the other chamber of the stroke simulator, wherein:

the portion in the first hydraulic line is in communication with a discharge side of the pump, in such a manner that brake fluid is transmitted from the other chamber to the wheel cylinder; and the piston is moved by closing the cutoff valve and supplying the one of the chambers of the stroke simulator with an amount of brake fluid, corresponding to an amount of brake operation, flowing from the master cylinder, such that one of the chambers is increased in volume and the amount of brake fluid, corresponding to the amount of brake operation, flowing via the third hydraulic line from the other chamber is used to apply pressure to the wheel cylinder.

22. A brake control system comprising:

a pump capable of generating hydraulic pressure in a first hydraulic line, using brake fluid from a reservoir, to generate hydraulic pressure in a wheel cylinder;

a one-way valve for admitting a flow of brake fluid from the pump to the first hydraulic line;

a stroke simulator comprising a piston that divides a cylinder into at least two chambers, the piston being configured to move axially in the cylinder under the action of brake fluid supplied from a master cylinder, thereby producing reaction force to a driver's brake operation;

a second hydraulic line provided between one of the two chambers of the stroke simulator and the master cylinder;

a third hydraulic line provided between the other chamber of the stroke simulator and the first hydraulic line to transmit brake fluid from the other chamber to the first hydraulic line;

a second one-way valve provided in the third hydraulic line to admit a flow of brake fluid from the other chamber to the first hydraulic line; and a fourth hydraulic line branching off from a portion between the second one-way valve in the third hydraulic line and the other chamber and located between the other chamber of the stroke simulator and the reservoir to admit a flow of brake fluid from the other chamber and a flow of brake fluid from the reservoir, wherein the third hydraulic line is connected to a portion of the first hydraulic line, which portion is in communication with a discharge side of the pump, in such a manner that brake fluid is transmitted from the other chamber to the wheel cylinder.

23. A method for generating brake hydraulic pressure, comprising:

providing a brake control system including:

a first hydraulic line connecting a master cylinder and a wheel cylinder;

a pump capable of generating hydraulic pressure in a wheel cylinder by pumping brake fluid from a reservoir into the first hydraulic line;

a cutoff valve provided in the first hydraulic line between the wheel cylinder and the master cylinder;

a stroke simulator comprising a piston that divides a cylinder into two chambers in a liquid tight manner, the piston being configured to move axially in the cylinder under the action of brake fluid, thereby producing reaction force to a driver's brake operation; and a second hydraulic line connecting a portion in the first hydraulic line between the cutoff valve and the master cylinder to one of the two chambers of the stroke simulator, and a third hydraulic line provided between the other chamber of the stroke simulator and a portion in the first hydraulic line between the cutoff valve and the wheel cylinder, the third hydraulic line being connected to a portion that is in communication with a discharge side of the pump, in such a manner that brake fluid is allowed to be transmitted from the other chamber to the wheel cylinder; and in a predetermined state of brake operation, actuating the pump and closing the cutoff valve to allow brake fluid from the master cylinder to flow into one of the two chambers of the stroke simulator, thereby moving the piston so that brake fluid flowing from the other chamber applies pressure to the wheel cylinder.

\* \* \* \* \*